(12) United States Patent
Stafford et al.

(10) Patent No.: US 11,420,131 B2
(45) Date of Patent: Aug. 23, 2022

(54) SYSTEMS AND METHODS FOR FACILITATING SECRET COMMUNICATION BETWEEN PLAYERS DURING GAME PLAY

(71) Applicant: Sony Interactive Entertainment Inc., Tokyo (JP)

(72) Inventors: Jeffrey Roger Stafford, Redwood City, CA (US); Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 179 days.

(21) Appl. No.: 16/866,435

(22) Filed: May 4, 2020

(65) Prior Publication Data

US 2021/0339151 A1  Nov. 4, 2021

(51) Int. Cl.
*A63F 13/87* (2014.01)
*A63F 13/23* (2014.01)
(Continued)

(52) U.S. Cl.
CPC .............. *A63F 13/87* (2014.09); *A63F 13/23* (2014.09); *A63F 13/285* (2014.09);
(Continued)

(58) Field of Classification Search
CPC ........ A63F 13/87; A63F 13/23; A63F 13/285; A63F 13/655; A63F 13/843; A63F 2300/1025; A63F 2300/1037; A63F 2300/572; A63F 2300/695; G06F 3/013; G06F 3/016; G06K 9/00335; G06K 9/6256; H04N 21/4781; H04N 21/4788
See application file for complete search history.

(56) References Cited

U.S. PATENT DOCUMENTS 7,749,089 B1 * 7/2010 Briggs .................... G07F 17/32
                                                            472/136
8,966,595 B1 * 2/2015 Amacker .............. G06F 21/606
                                                            715/733

(Continued)

OTHER PUBLICATIONS

PCT/US2021/027972, Notification of Transmittal of the International Search Report and the Written Opinion of the International Searching Authority, or the Declaration, PCT/ISA/220, and the International Search Report, PCT/ISA/210, dated Jun. 30, 2021.

(Continued)

*Primary Examiner* — Malina D. Blaise
(74) *Attorney, Agent, or Firm* — Penilla IP, APC

(57) ABSTRACT

Systems and methods for facilitating secret communication between players are described. One of the methods includes receiving image data of a first player to identify one or more gestures and receiving input data indicating a response of a second player to the one or more gestures. The method further includes training a model using the image data and the input data to generate an inference of communication between the first user and the second user. The method also includes generating additional inferences of communication between the first user and the second user. The method includes generating a recommendation to the second user based on the inference of communication and the additional inferences of communication.

16 Claims, 17 Drawing Sheets

(51) Int. Cl.
  *A63F 13/285* (2014.01)
  *A63F 13/655* (2014.01)
  *G06F 3/01* (2006.01)
  *G06K 9/62* (2022.01)
  *H04N 21/478* (2011.01)
  *H04N 21/4788* (2011.01)
  *G06V 40/20* (2022.01)
  *A63F 13/843* (2014.01)

(52) U.S. Cl.
  CPC ............ *A63F 13/655* (2014.09); *G06F 3/013* (2013.01); *G06F 3/016* (2013.01); *G06K 9/6256* (2013.01); *G06V 40/20* (2022.01); *H04N 21/4781* (2013.01); *H04N 21/4788* (2013.01); *A63F 13/843* (2014.09); *A63F 2300/1025* (2013.01); *A63F 2300/1037* (2013.01); *A63F 2300/572* (2013.01); *A63F 2300/695* (2013.01)

(56) References Cited

U.S. PATENT DOCUMENTS

| | | | | |
|---|---|---|---|---|
| 8,970,348 | B1* | 3/2015 | Evans | G06V 40/176 340/5.83 |
| 9,075,761 | B1* | 7/2015 | Salgar | G06F 15/16 |
| 9,202,105 | B1* | 12/2015 | Wang | H04N 21/44008 |
| 10,346,675 | B1* | 7/2019 | Nagalla | G06V 40/70 |
| 10,354,126 | B1* | 7/2019 | Nagalla | G06V 40/20 |
| 10,733,275 | B1* | 8/2020 | Knas | G06V 40/18 |
| 2011/0173204 | A1 | 7/2011 | Murillo et al. | |
| 2013/0022235 | A1* | 1/2013 | Pettit | A63F 13/655 382/103 |
| 2013/0039531 | A1* | 2/2013 | Basso | G06F 3/005 382/103 |
| 2013/0121584 | A1* | 5/2013 | Bourdev | G06V 40/171 382/218 |
| 2013/0173926 | A1* | 7/2013 | Morese | G06V 40/70 713/186 |
| 2014/0109023 | A1 | 4/2014 | Murillo et al. | |
| 2014/0237392 | A1* | 8/2014 | Hoomani | A63F 13/87 715/757 |
| 2015/0097770 | A1 | 4/2015 | Basso et al. | |
| 2015/0131850 | A1* | 5/2015 | Qvarfordt | G06F 3/013 382/103 |
| 2015/0273321 | A1* | 10/2015 | Schwartz | A63F 13/428 463/36 |
| 2015/0347734 | A1* | 12/2015 | Beigi | H04L 9/3268 726/28 |
| 2016/0019539 | A1* | 1/2016 | Hoyos | G06Q 20/3821 705/75 |
| 2016/0034044 | A1 | 2/2016 | Basso et al. | |
| 2016/0342221 | A1 | 11/2016 | Basso et al. | |
| 2017/0111337 | A1* | 4/2017 | Saboori | G06F 21/31 |
| 2017/0144067 | A1 | 5/2017 | Murillo et al. | |
| 2017/0243225 | A1* | 8/2017 | Kohli | G06F 21/42 |
| 2019/0107935 | A1* | 4/2019 | Spivack | G06T 19/20 |
| 2019/0143204 | A1* | 5/2019 | Aman | A63F 13/30 463/31 |
| 2019/0174304 | A1* | 6/2019 | Tunnell | H04L 63/0861 |
| 2020/0134298 | A1* | 4/2020 | Zavesky | H04N 7/157 |
| 2021/0166008 | A1 | 6/2021 | Zavesky et al. | |

OTHER PUBLICATIONS

Vardhan et al., "Gesture recognition using kinect for sign language translation", 2013 IEEE Second Int'l Conference on Image Information Processing, (ICIIP-2013), Dec. 9, 2013, pp. 96-100, XP032544768, DOI: 10.1109/ICIIP.2013.6707563, ISBN: 978-1-4673-6099-9.

Beatrice S et al., "Real-Timegesture translation in intercultural communication", AI & Society, Springer Verlag, Berlin, DE, vol. 32, No. 1, Oct. 16, 2014, pp. 25-35, XP036146159, ISSN: 0951-5666, DOI: 10.1007/00146-014-0573-4.

* cited by examiner (Esports)

(No Game Console)

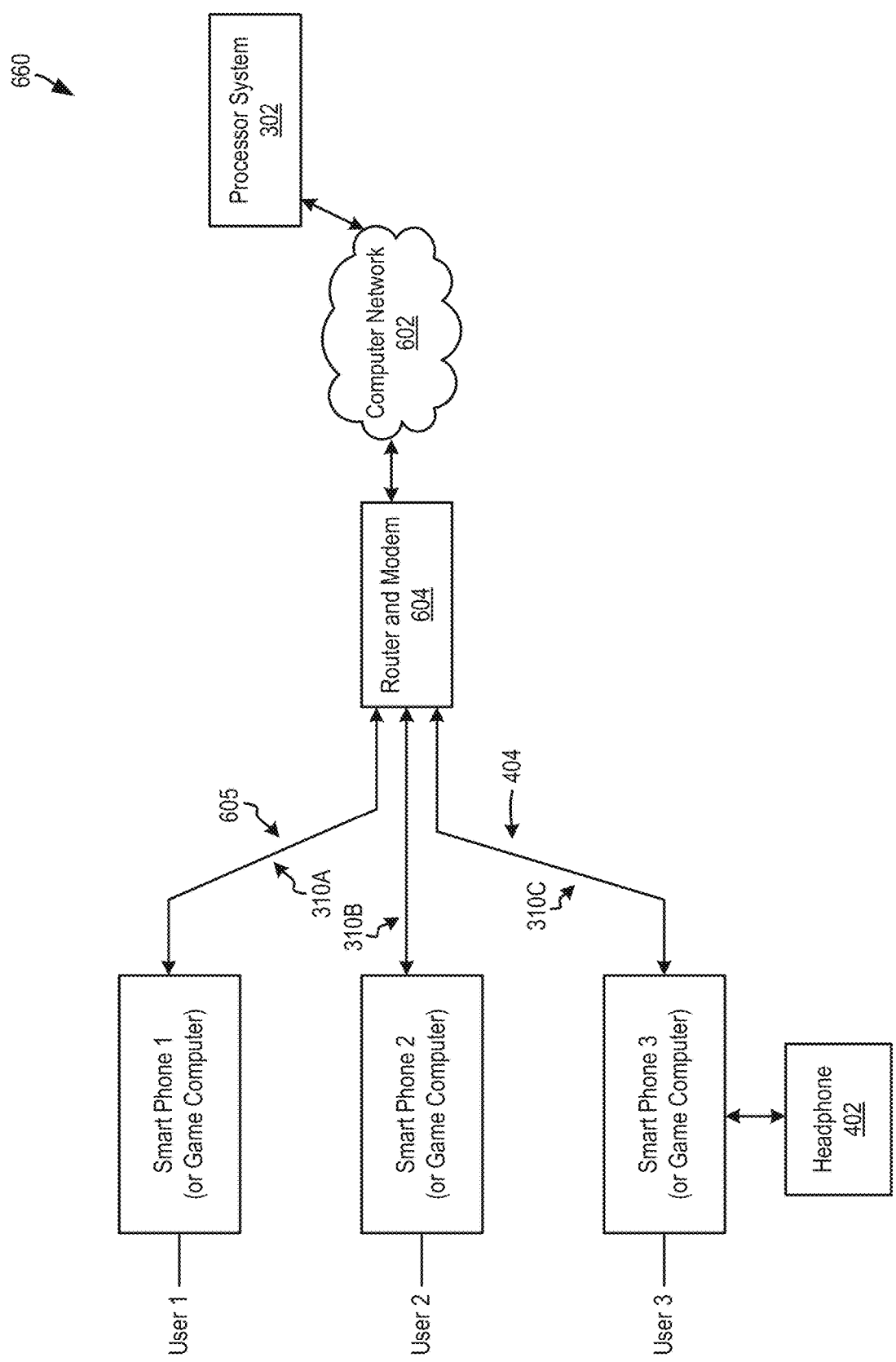

SYSTEMS AND METHODS FOR FACILITATING SECRET COMMUNICATION BETWEEN PLAYERS DURING GAME PLAY

FIELD

The present disclosure relates to systems and methods for facilitating secret communication between players during game play.

BACKGROUND

During a play of a video game, multiple players engage in competitive behavior. For example, multiple teams of players are formed to play the video game. A first team includes two or more players and a second team includes two or more players. The players of the first team compete with the players of the second team to win the video game, such as score a high number of virtual points or to win a virtual reward. During the play of the game, the players of the first team or of the second team engage in communication with each other to act as a team. A team effort usually helps players win the video game.

It is in this context that embodiments of the invention arise.

SUMMARY

Embodiments of the present disclosure provide systems and methods for facilitating secret communication between players during game play.

Systems and methods for facilitating secret communication between players are described. In an embodiment, one of the methods includes receiving image data of a first player to identify one or more gestures and receiving input data indicating a response of a second player to the one or more gestures. The method further includes training a model using the image data and the input data to generate an inference of communication between the first user and the second user. The method also includes generating additional inferences of communication between the first user and the second user. The method includes generating a recommendation to the second user based on the inference of communication and the additional inferences of communication.

In one embodiment, a system for facilitating secret communication between a first player and a second player during a play of a game is described. The system includes an image camera configured to capture image data of the first player to identify one or more gestures. The system further includes a server coupled to the image camera via a computer network. The server is configured to receive input data indicating a response of the second player to the one or more gestures. The server is further configured to train a model using the image data and the input data to generate an inference of communication between the first user and the second user. The server is also configured to generate additional inferences of communication between the first user and the second user. The server is configured to generate a recommendation to the second user based on the inference of communication and the additional inferences of communication.

In an embodiment, a computer system for facilitating secret communication between a first player and a second player during a play of a game is described. The computer system includes a processor configured to receive image data of the first player to identify one or more gestures. The processor is further configured to receive input data indicating a response of the second player to the one or more gestures. The processor is configured to train a model using the image data and the input data to generate an inference of communication between the first user and the second user, generate additional inferences of communication between the first user and the second user, and generate a recommendation to the second user based on the inference of communication and the additional inferences of communication. The system includes a memory device coupled to the processor.

Some advantages of the herein described systems and methods for facilitating secret communication include training an artificial intelligence model to recognize one or more gestures that are performed by a first user, predict one or more actions to be taken by a second user in response to the one or more gestures, and inform the second user to perform the one or more actions in a secret manner without informing a third user. For example, over a predetermined time period, the artificial intelligence model is provided data regarding the one or more gestures performed by the first user and data regarding the one or more actions that are taken by the second user in response to the one or more gestures. The artificial intelligence model determines a probability that the second user will perform the one or more actions based on the data provided to the artificial intelligence model. The artificial intelligence model predicts that the second user will take the one or more actions the next time the first user will make the one or more gestures. In response to receiving an indication of the one or more gestures performed by the first user, the artificial intelligence model sends a communication to the second user to take the one or more actions. The communication to the second user is sent in such a manner that chances of the third user being informed of the communication are low, such as negligible or zero. For example, the second user is wearing a headphone and the communication is sent via the headphone to the second user.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 6C is a diagram of an embodiment of a system to illustrate communication between the processor system that executes the model and multiple smart phones.

DETAILED DESCRIPTION

Systems and methods for facilitating secret communication between players during game play are described. It should be noted that various embodiments of the present disclosure are practiced without some or all of these specific details. In other instances, well known process operations have not been described in detail in order not to unnecessarily obscure various embodiments of the present disclosure.

Figure 1:
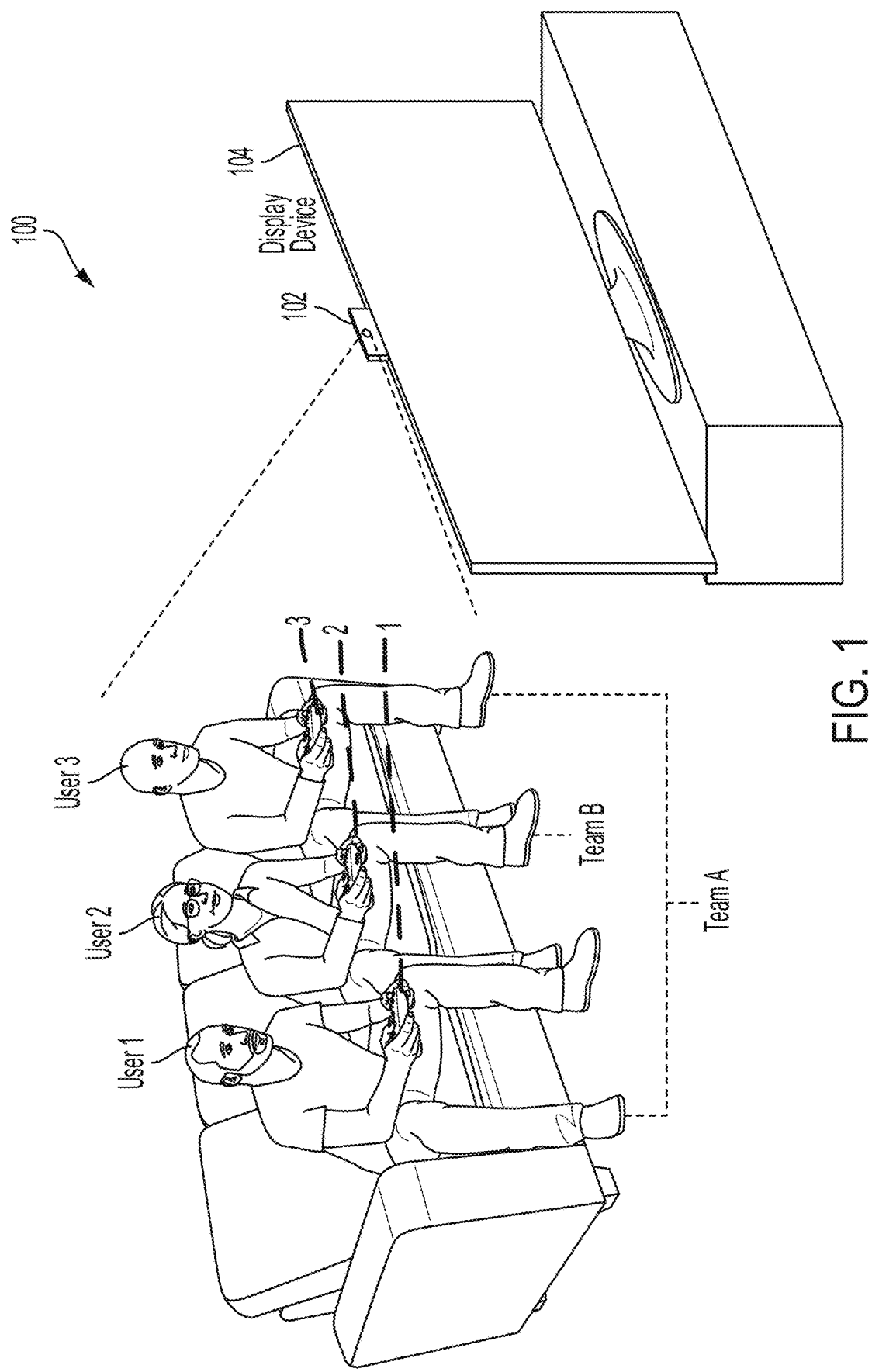
FIG. 1 is a diagram to illustrate a system for illustrating a play of a game between multiple users of a team.

FIG. 1 is a diagram to illustrate a system 100 for illustrating game play between users 1, 2, and 3 during a play of a game. An example of the game includes a videogame, such as Fortnite™, Minecraft™, and World of Warcraft™. The system 100 includes a display device 104 having a camera 102. An example of the display device 104 is a television, such as a smart television. Other examples of the display device 104 includes a liquid crystal display device (LCD), a light emitting diode (LED) display device, and a plasma display device. An example of the camera 102 includes a high-speed camera or an event-based camera. An example of the high-speed camera includes a digital camera that records at a rate of at least 6000 frames per second. To illustrate, the high-speed camera records at a rate of 17,000 frames per second or 26,760 frames per second. The high-speed camera can have an internal storage of 72 (gigabytes) GB, 444 GB, or 288 GB, and is expandable to have a storage of 1 to 2 terabytes (TB). As an example, the event-based camera recognizes an event, such as a gesture of the user 1, within a field-of-view of the event-based camera, and captures images of the event. To illustrate, the field-of-view has a background that is stationary for a time period and real-world objects that move in the background during the time. Examples of the real-world objects include any of the users 1-3, and body parts of the user. Examples of a body part are provided below. The real-world objects are within the field-of-view of the event-based camera. The event-based camera can be used to capture images and each of the images is processed to have pixels that include data regarding the movement of the real-world objects, but do not have pixels that include data regarding the background, which is stationary. For example, pixels that display the background can be processed by a processor to be black or of a uniform color, texture, and intensity. In this manner, the images captured by the event-based camera are processed to highlight the movement of the real-world objects within the background. As an example, the background includes other real-world objects that are stationary. To illustrate, if the user 2 is stationary, the images are processed to have pixels that do not include data regarding the user 2.

The users 1-3 are players playing the game. During the play of the game, the users 1 and 3 are grouped in a team A and the user 2 is a member of a team B. The team A is playing against the team B. The users 1-3 play the game using game controllers 1, 2, and 3. For example, the user 1 plays the game using a hand-held game controller, the user 2 plays the game using a hand-held game controller, and the user 3 plays the game using a hand-held game controller. An example of a hand-held game controller, as described herein, includes a DualShock™ game controller available from Sony corporation. To illustrate, the hand-held game controller includes multiple buttons to control actions of a virtual object in the game, or to achieve a transition from one virtual scene to another virtual scene in the game, or to log out of the game, or to log into the game. As another illustration, the hand-held game controller includes multiple joysticks to control movement of a virtual object in the game. The joysticks are operated by a user, described herein, to control a game character to jump up and down, to run, to walk, to swim, to fly, or hop on a virtual vehicle.

In one embodiment, the game is played by a greater or a lower number of users than that illustrated using FIG. 1.

In an embodiment, instead of the display device 104, each user 1-3 is using a separate display device, such as a tablet or a computer monitor or a smart phone to play the game.

In one embodiment, a hand-held game controller is a smart phone or a Nintendo™ switch game controller.

In an embodiment, more than one camera, such as the camera 102 and one or more additional cameras, is used to capture images of gestures that are performed by the users 1 and 3. For example, three cameras are placed in the real-world environment to capture the images of the gestures performed by the users 1 and 3. The cameras are parts of a camera system.

In one embodiment, the camera 102 is not integrated within the display device 104. For example, the camera 102 is placed below or in front of or above or to a side of the display device 104.

In one embodiment, the team A includes any other number of players, such as one, two, three or five players, and the team B includes any other number of players, such as one, two, three, four, five, or six players.

Figure 2:
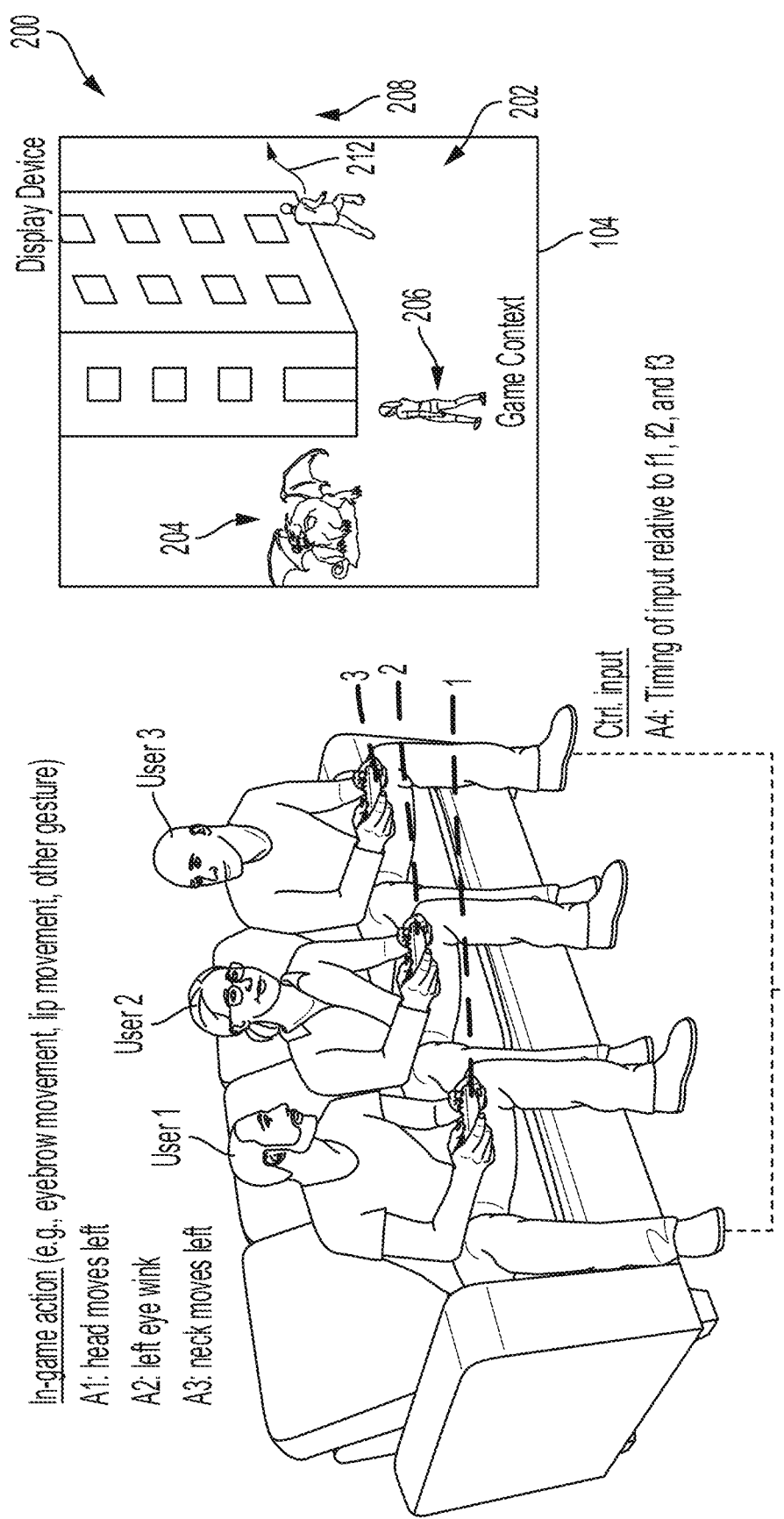
FIG. 2 is a diagram of an embodiment of a system to illustrate secret communication between the users.

FIG. 2 is a diagram of an embodiment of a system 200 to illustrate a secret communication between the user 1 and the user 3. The communication between the users 1 and 3 is secret in that the communication is to be kept secret from the user 2. The user 2 cannot know of the secret communication between the users 1 and 3 during the play of the game. For example, the communication between the users 1 and 3 is covert and is made by the user 1 using gestures without talking to the user 3. The user 2 is not shown in FIG. 2 to avoid cluttering the FIG. 2.

During the play of the game, such as during one or more gaming sessions, the user 1 performs three actions, including an action 1 (A1), and action 2 (A2), and an action 3 (A3) to facilitate generation of an occurrence of a virtual scene 202 of the game. For example, the user 1 makes facial gestures, such as tilts his/her head to his/her left, tilts his/her neck to his/her left, and winks his/her left eye. Winking of an eye or movement of a lens of the eye is an example of an eye gaze. Other examples of the actions performed by the user 1 include other facial gestures, such as movement of eyebrows of the user 1 and movement of lips of the user 1. Yet other example of the actions performed by the user 1 include hand gestures, such as extending out a finger or a thumb or one or more fingers to make a sign. In this example, the user 1 uses one hand to hold the game controller 1 and uses the other hand to make a hand gesture, and then reverts back to using both hands to use the game controller 1.

As an example, a gaming session is a time interval in which the game is played after the users 1-3 log into their corresponding user accounts until the users 1-3 log out of their corresponding user accounts. As another example, a gaming session is a time interval in which the game is played after the users 1-3 log into their corresponding user accounts until client devices, such as game controllers or smart phones or tablets or computers, that the users 1-3 operate to play the game get disconnected from a computer network.

The virtual scene 202 provides or is a game context of the game. For example, the virtual scene 202 includes virtual objects 204, 206, 208, and 210. The virtual object 204 is a monster, the virtual object 206 is a game character that is controlled by the user 1 via the game controller 1, and the virtual object 208 is a game character that is controlled by the user 3 via the game controller 3.

The user 1 is indicating to the user 3 by performing the actions A1 through A3 that the monster is coming and that the virtual object 208 should run away. During the one or more gaming sessions, the user 3 notices the actions 1 through 3 and in response to the actions A1 through A3, the user 3 controls the game controller 3 to perform one or more actions, such as an action A4. Examples of the action A4 include selection of a button on the game controller 3 or movement of the joystick of the game controller 3 or a combination thereof. When the action A4 is performed, the game controller 3 generates control input data, such as control input data 310C, which is processed by the game engine 316 to control the virtual object 208 to run in a direction 212 away from the monster 204. For example, the user 3 moves a joystick of the game controller 3 to control the virtual object 208 to run away from the monster 204. The control input data 310C and the game engine 316 are further described below. The virtual scene 202 includes that the virtual object 208 runs in the direction 212.

In one embodiment, the user 3 is presented with a different game context than a game context that is represented to the user 1. For example, a virtual scene that is displayed on a display device that is held by the user 3 is different than a virtual scene that is displayed on a display device held by the user 1. The virtual scenes are portions of the same game context. For example, the display device held by the user 3 displays the virtual objects 206, 208, and 210 but does not display the virtual object 204. The virtual object 204 is hidden behind the virtual object 210. Also, in this example, the display device held by the user 1 displays the virtual scene 202 having the virtual objects 204, 206, 208, and 210.

Figure 3A:
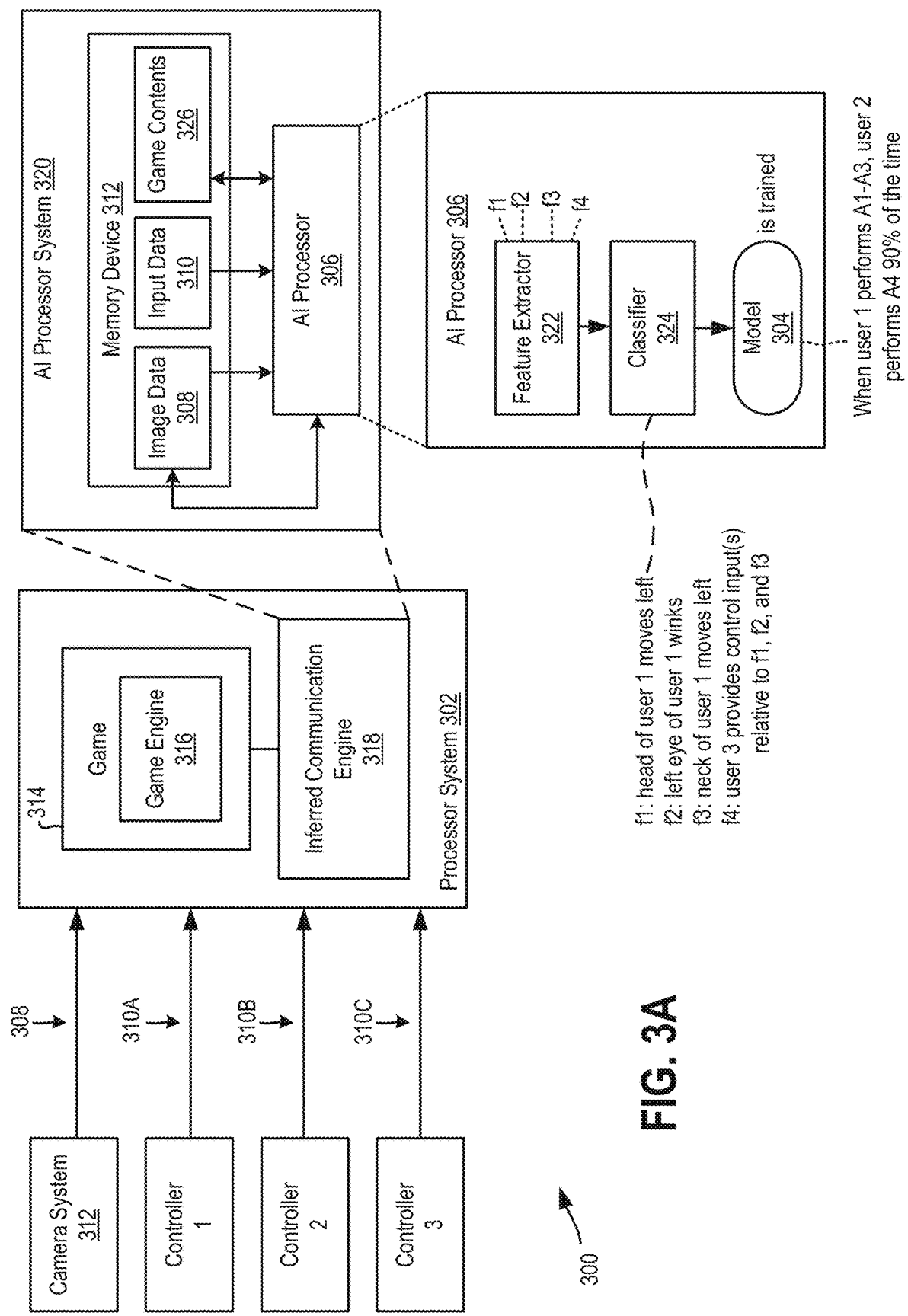
FIG. 3A is a diagram of an embodiment of a system to illustrate training of an artificial intelligence (AI) model using image data and control input data.

FIG. 3A is a diagram of an embodiment of a system 300 to illustrate training of a model 304, such as an artificial intelligence (AI) model, using image data 308, or control input data 310A, 310B, or 310C, or a combination thereof, generated during the one or more gaming sessions. The system 300 includes a camera system 312, the game controllers 1-3, and a processor system 302. The processor system 302 is sometimes referred to herein as a server system. The camera system 312 includes the camera 102 and any other cameras that are placed in the real-world environment in which the users 1-3 are playing the game.

The processor system 302 includes one or more processors of one or more servers that execute a game 312 for play by the users 1-3. For example, the servers that execute the game 312 are servers of a data center or a cloud network that executes the game 312. The servers are located within one data center or are distributed across multiple data centers. As another example, the game 312 is executed by a virtual machine, which is implemented using one or more servers of one or more data centers. Examples of the game 312 are provided above.

The game 314 includes the game engine 316. As an example, the game engine 316 is a computer software to build and create animation, which includes a virtual scene. The game engine 316 renders graphics and applies laws of physics, such as collision detection, to virtual objects of the game 314. As an illustration, the game engine 316 is executed to determine positions and orientations of virtual objects displayed in a virtual scene. As another illustration, the game engine 316 is executed to determine movement of each virtual object in a virtual scene.

Each user 1-3 accesses the game 314 after being authenticated by an authentication server of the processor system 302 and logging into his or her user account. For example, a user provides his or her login information, such as a username and password, via a game controller operated by the user to the processor system 302. The authentication server of the processor system 302 authenticates the login information to allow the user to log into the user account to access the user account. Once the user account is accessed, the user is able to play the game 314. The user logs out of his/her user account by selecting a log out button that is displayed on a display screen of the client device.

The game engine 316 is coupled to an inferred communication engine 318, which is a computer software that is executed by the processor system 302, which includes an AI processor 306. The inferred communication engine 318 trains the model 304 and applies the model 304 to estimate or predict, with greater than a pre-determined amount of probability, an action that will be performed by the user 3 in response to actions performed by the user 1. An example of the pre-determined amount of probability is a probability greater than 50%. Another example of the pre-determined amount of probability is a probability greater than 70%.

An example of the model 304 is a computer software that receives data inputs and predicts one or more outcomes based on the data inputs. The model 304 is trained based on the data inputs received over a period of time to predict the one or more outcomes at an end of the period of time. For example, the model 304 is trained based on the image data 308 and the control input data 310C generated during the one or more gaming sessions.

The processor system 302 includes an AI processor system 320, which includes the AI processor 306 and a memory device 312. Examples of the memory device 312 include a random access memory. To illustrate, the memory device 312 is a flash memory or a redundant array of independent disks (RAID). The memory device 312 is coupled to the AI processor 306.

The AI processor 306 includes a feature extractor 322, a classifier 324, and the model 304. The feature extractor 322 and the classifier 324 are computer software programs that are executed by the AI processor 306 to train the model 304.

The camera system 312 and the game controllers 1-3 are coupled to the processor system 302. For example, the camera system 312 and the game controllers 1-3 are coupled to the processor system 302 via a computer network or a combination of the computer network and a cellular network. Examples of the computer network include the Internet, an intranet, and a combination of the Internet and intranet.

The image data 308 that is captured by the camera system 312 during the one or more gaming sessions is provided to the processor system 302. An example of image data 308 includes one or more images of the actions A1-A3 performed by the user 1. Also, the controller 1 provides the control input data 310A to the processor system 302 during the one or more gaming sessions. The control input data 310A is generated by the controller 1 when one or more buttons and/or one or more joysticks of the controller 1 are operated by the user 1 during the one or more gaming sessions. Similarly, the control input data 310B is generated by the controller 2 when one or more buttons and/or one or more joysticks of the controller 2 are operated by the user 2 during the one or more gaming sessions, and the control input data 310C is generated by the controller 3 when one or more buttons and/or one or more joysticks of the controller 3 are operated by the user 3 during the one or more gaming sessions.

One or more of the control input data 310A, 310B, and 310C is referred to herein as control input data 310, which is stored in the memory device 312. Also, the image data 308 is stored in the memory device 312, and game contexts 326 are stored in the memory device 312. The virtual scene 202 (FIG. 2) is an example of the game contexts 326. The game contexts 326 include one or more additional virtual scenes in addition to the virtual scene 202. Each virtual scene, as described herein, is data that includes positions and orientations of multiple virtual objects in the virtual scene. For example, a first virtual scene includes a first position and a first orientation of a first virtual object and a first position and a first orientation of a second virtual object. A second virtual scene includes a second position and a second orientation of the first virtual object and a second position and a second orientation of the second virtual object. The second virtual scene is displayed consecutive in time to the first virtual scene. The second position of the first virtual object is consecutive to the first position of the first virtual object and the second position of the second virtual object is consecutive to the first position of the second virtual object. Also, the second orientation of the first virtual object is consecutive to the first orientation of the first virtual object and the second orientation of the second virtual object is consecutive to the first orientation of the second virtual object. As another example, the game contexts 326 include a virtual scene that is displayed in time preceding to a display of the virtual scene 202.

The AI processor 306 processes the image data 308, the control input data 310, and the game contexts 326 to train the model 304. For example, the feature extractor 322 extracts features f1, f2, f3, and f4 from the image data 308 and the control input data 310. An example of a feature of the image data 308 includes a left eye of the user 1, or a right eye of the user 1, or a head of the user 1, or a left eyebrow of the user 1, or a right eyebrow of the user 1, or a neck of the user 1, or a skeleton of the user 1, or a left hand of the user 1, or a right hand of the user 1, or a left arm of the user 1, or a right arm of the user 1, or an index finger of the user 1, or a combination thereof. The eye, the head, the eyebrow, the neck, the skeleton, the hand, and the arm of the user 1 are examples of the body part of the user 1. An example of a feature of the control input data 310 includes a movement in a direction of a joystick or a selection of a button of the game controller 3. As another example, the feature extractor 322 identifies, from the image data 308, the head of the user 1. The feature extractor 322 identifies the head of the user 1 from a comparison of the head with a pre-determined shape and a pre-determined size of a head of a person. The pre-determined shape and the pre-determined size of the head are stored within the memory device 312. As yet another example, the feature extractor 322 identifies the neck of the user 1 from a comparison of the neck with a pre-determined shape and a pre-determined size of a neck of a person. The pre-determined shape and the pre-determined size of the neck are stored within the memory device 312. As still another example, the feature extractor 322 identifies the left eye of the user 1 from a comparison of the left eye with a pre-determined shape and a pre-determined size of a left eye of a person. The pre-determined shape and the pre-determined size of the left eye are stored within the memory device 312. As another example, the feature extractor 322 identifies from the control input data 310 that a button labeled "X" is selected on the game controller 3 operated by the user 3 compared to another button labeled "O" on the game controller 3 or compared to movement of a joystick on the game controller 3. The control input data 310 includes an identity, such as a media access control (MAC) address or an alphanumeric identifier, of the game controller 3 and includes an identity of whether the "X" button or the "O" button or the joystick is used. The control input data 310 further includes a direction of movement of the joystick of the game controller 3 and an amount of movement of the joystick. Examples of the direction of movement of the joystick include an up movement, a down moment, a right movement, a clockwise movement, a counterclockwise movement, and a left movement. An example of the amount of movement of the joystick of the game controller 3 includes an amount greater than a pre-determined amount, which is stored in the memory device 312.

During processing of the image data 308 that is received from the event-based camera, the AI processor 306 processes, such as interprets, pixels that display the background to be black or of a uniform color, texture, and intensity. The background is stationary and does not change with movement of the users 1-3 from FIG. 1. In this manner, the AI processor 306 processes the image data 308 captured by the event-based camera to highlight the movement of the users 1-3 within the background.

The classifier 324 classifies the features that are identified by the feature extractor 322. For example, the classifier 324 determines that the head of the user 1 has moved in a pre-determined direction, such as a left direction, by greater than a pre-determined amount. Other examples of the pre-determined direction of movement of the head of the user 1 include a right direction or an up direction or a down direction or turning in a clockwise direction or turning in a counterclockwise direction. The pre-determined direction and the pre-determined movement of the head are stored in the memory device 312. As another example, the classifier 324 determines that the neck of the user 1 has moved in a pre-determined direction, such as a left direction, by greater than a pre-determined amount. Other examples of the pre-determined direction of movement of the neck of the user 1 include a right direction or a forward direction or a backward direction or turning in a clockwise direction or turning in a counterclockwise direction. The pre-determined direction and the pre-determined movement of the neck are stored in the memory device 312. As another example, the classifier 324 determines that an eyelid of the left eye of the user 1 has moved in a pre-determined direction, such as a down direction, by greater than a pre-determined amount. Other examples of the pre-determined direction of movement of the left eye of the user 1 include a right direction or an up direction or a left direction or a right direction of movement of an eye lens of the eye of the user 1. The pre-determined direction and the pre-determined movement of the left eye are stored in the memory device 312.

The classifier 324 determines that the actions A1 through A3 are performed by the user 1 by classifying the features f1 through f3 and determines the action A4 is performed by the user 3 by classifying the feature f4. The classifier 324 further determines that the action A4 is performed. For example, upon determining that the user 1 tilts his/her head in the pre-determined direction by greater than the pre-determined amount, the classifier 324 determines that the user 1 has performed the action A1 of tilting his/her head. As another example, upon determining that the user 1 moves his/her left eyelid in the pre-determined direction by greater than the pre-determined amount, the classifier 324 determines that the user 1 has performed the action A2 of winking his/her left eye. As yet another example, upon determining that the user 1 tilts his/her neck in the pre-determined direction by greater than the pre-determined amount, the classifier 324 determines that the user 1 has performed the action A3 of moving his/her neck to his/her left. As another example, upon determining that the user 3 has moved the joystick of the game controller 3 upward by greater than the pre-determined amount, the classifier 324 determines that the user 3 has performed the action A4 of moving the joystick of the controller 3 in the upward direction.

The classifier 324 determines whether the control input data 310C is generated within a pre-determined time period of generation of the image data 308. To illustrate, a time of generation of the control input data 310C is received with the control input data 310C from the controller 3 by the processor system 302. The controller 3 has a clock source that measures a time at which a joystick of the game controller 3 is moved or a button of the game controller 3 is selected by the user 3. Examples of a clock source, as used herein, include a clock signal generator, an Internet clock source, and an electronic oscillator. Similarly, a time period of generation of the image data 308 is received with the image data 308 from the camera system 312 by the processor system 302. Each camera of the camera system 312 has a clock source that measures the time period of generation of the image data 308. The classifier 324 determines whether the time of generation of the control input data 310C is within a pre-determined limit from an end of the time period of generation of the image data 308. Upon determining that the time of generation of generation of the control input data 310C is within the pre-determined limit from the end of the time period of generation of the image data 308, the classifier 324 determines that the control input data 310C is generated in response to the image data 308. On the other hand, upon determining that the time of generation of the input data 310C is not within or outside the pre-determined limit from the end of the time period of generation of the image data 308, the classifier 324 determines that the control input data 310C is not generated in response to the image data 308.

The classifier 324 further identifies a game context associated with the features f1 through f4. For example, the classifier 324 sends a request to the game engine 316 to identify positions and orientations of the virtual objects 204, 206, 208, and 210 (FIG. 2). The game engine 316 receives the control input data 310A from the game controller 1 and determines a position and an orientation of the virtual object 206 in the virtual scene 202 (FIG. 2) based on the control input data 310A. Moreover, the game engine 316 identifies a position and an orientation of the virtual object 204 and a position and an orientation of the virtual object 210 during a time period at which the virtual object 206 has the position and the orientation in the virtual scene 202. The processor system 302 has a clock source, such as an Internet clock source, to determine the time period in which the virtual objects 204, 206, and 208 have the corresponding positions and orientations in the virtual scene 202. Also, the game engine 316 receives the control input 310C from the game controller 3 and determines movement of the virtual object 208. To illustrate, the game engine 316 determines that the virtual object 208 is running away in the direction 212 (FIG. 2) during the time period. In response to the request received from the classifier 324, the game engine 316 provides the positions and orientations of the virtual objects 204, 206, 208, and 210 to the classifier 324. Upon receiving the positions and orientation, the classifier 324 identifies the game context of the virtual scene 202. The game context of the virtual scene 202 includes the positions and orientations of the virtual objects 204, 206, and 210. Moreover, the game context of the virtual scene 202 includes the movement of the virtual object 208 in the direction 212. The game context of the virtual scene 202 is an example of the game contexts 326.

The classifier 324 associates, such as establishes a correspondence between, the game context, such as the virtual scene 202, and a set of the actions A1 through A4 that are determined as being performed by the users 1 and 3. The actions A1-A4 are performed to generate the game context. An example of the correspondence between the game context and the set of actions performed by the users 1 and 3 includes a one-to-one relationship or a link or a unique relationship. For example, the classifier 324 determines that the action A4 is performed by the user 3 in response to the actions A1-A3 performed by the user 1 and that the actions A1-A4 are performed to generate the game context to establish a positive correspondence between the actions A1-A3, the action A4, and the game context generated based on the actions A1-A4. The classifier 324 determines that the action A4 is performed in response to the actions A1-A3 upon determining that the control input data 310C is generated within the pre-determined limit from the end of the time period of generation of the image data 308. As another example, the classifier 324 determines that the action A4 is not performed by the user 3 in response to the actions A1-A3 performed by the user 1 to establish a negative correspondence between the actions A1-A3, the action A4, and the game context generated based on the actions A1-A4. The classifier 324 determines that the action A4 is not performed in response to the actions A1-A3 upon determining that the control input data 310C is not generated within or outside the pre-determined limit from the end of the time period of generation of the image data 308.

The classifier 324 trains the model 304 based on the correspondence, such as the positive correspondence or the negative correspondence, that is established between the game context and the actions A1 through A4. For example, the classifier 324 provides data of the game context, such as the virtual scene 202, and data indicating the actions A1-A4, and the correspondence to the model 304. The model 304 receives the correspondence established between the game context and the actions A1 through A4 to generate an inference of communication between the user 1 and the user 3. For example, the model 304 determines that the user 3 performs the action A4 in response to the actions A1-A3 performed by the user 1.

During the one or more gaming sessions, additional correspondences, such as positive correspondences and negative correspondences, between additional actions performed by the users 1 and 3 and additional game contexts, such as the game contexts 326, of the game 314 are received by the model 304 from the classifier 324. The model 304 receives the additional correspondences to generate additional inferences of communication between the users 1 and 3. For example, the model 304 determines that the user 3 performs the action A4 for each additional instance or additional time in response to the actions A1-A3 being performed by the user 1 for the additional instance or additional time.

The correspondence established between the game context and the actions A1 through A4 and the additional correspondences are examined by the model 304 to determine a probability that the user 3 will perform the action A4 in response to the user 1 performing the actions A1-A3. For example, upon receiving a greater number of positive correspondences between the actions A1-A3 and the action A4 than a number of negative correspondences between the actions A1-A3 and the action A4, the model 304 determines that it is more likely than not, e.g., there is greater than 50% probability, that the user 3 will perform the action A4 to control the virtual object 208 to run away when the user 1 performs the actions A1 through A3. As another example, upon receiving a number of positive correspondences between the actions A1-A3 and the action A4 that is greater than a number of negative correspondences between the actions A1-A3 and the action A4 by a pre-determined amount, the model 304 determines that there is a 70% or a 90% chance that the user 3 will perform the action A4 to control the virtual object 208 to run away when the user 1 performs the actions A1 through A3. As yet another example, upon receiving a greater number of negative correspondences between the actions A1-A3 and the action A4 than a number of positive correspondences between the actions A1-A3 and the action A4, the model 304 determines that it is not likely, e.g., there is less than 50% probability, that the user 3 will perform the action A4 to control the virtual object 208 to run away when the user 1 performs the actions A1 through A3.

In one embodiment, the inferred communication engine 318 is executed by one or more servers. For example, the game engine 316 is executed by one or more servers and the inferred communication engine 318 is executed by one or more servers. The one or more servers executing the game engine 316 are the same or different from the one or more servers executing the inferred communication engine 318. The one or more servers executing the inferred communication engine 318 are located within the same data center or a different data center that executes the game engine 316.

In an embodiment, instead of the AI processor 306, multiple AI processors are used to execute the feature extractor 322 and the classifier 324 to train the model 304.

In one embodiment, the camera system 312 and the game controllers 1-3 are coupled to the processor system 302 via a cable or via a local radio frequency (RF) wireless connection.

Figure 3B:
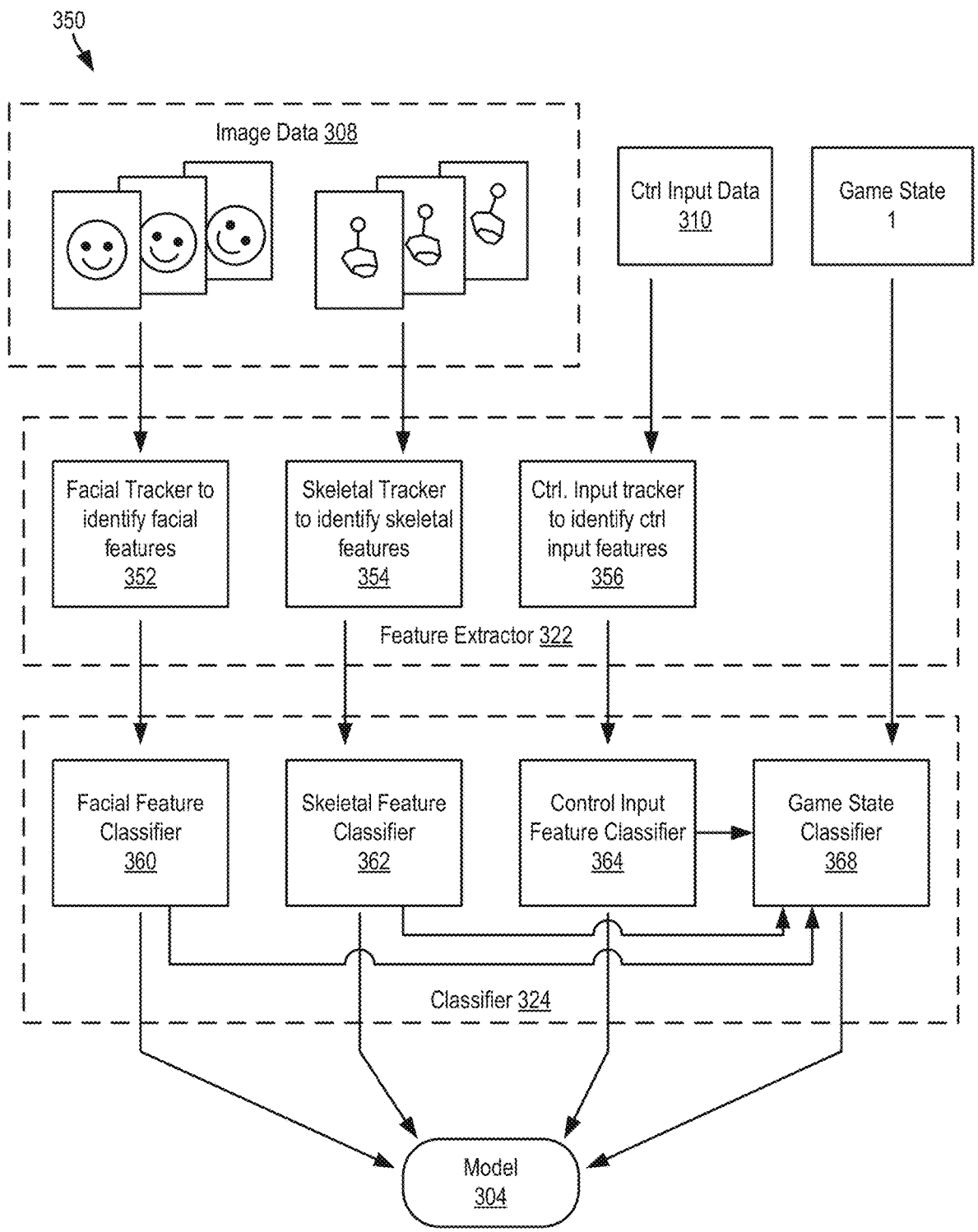
FIG. 3B is a diagram of an embodiment of a system to illustrate training of the model.

FIG. 3B is a diagram of an embodiment of a system 350 to illustrate training of the model 304. The system 350 includes the feature extractor 322 and the classifier 324. The system 350 also includes the model 304. The feature extractor 322 further includes a facial tracker 352, a skeletal tracker 354, and a control input tracker 356. Moreover, the classifier 324 includes a facial feature classifier 360, a skeletal feature classifier 362, a control input feature classifier 364, and a game state classifier 368. As an example, each tracker 352, 354, and 356 is a computer software that is executed by one or more servers. Similarly, as an example, each classifier 360, 362, 364, and 368 is a computer software that is executed by one or more servers. As another example, each tracker 352, 354, and 356, and each classifier 360, 362, 364, and 368 is implemented using a combination of hardware and software such as within a field programmable gate array (FPGA) or a programmable logic device (PLD). To illustrate, each tracker 352, 354, and 356, and each classifier 360, 362, 364, and 368 is a separate logic block on the PLD.

The facial tracker 352 is coupled to the facial feature classifier 360. Also, the skeletal tracker 354 is coupled to the skeletal feature classifier 362. The control input tracker is coupled to the control input feature classifier 364. The classifiers 360, 362, 364, and 368 are coupled to the model 304. The classifiers 360, 362, and 364 are coupled to the classifier 368.

The facial tracker 352 receives the image data 308 and identifies facial features, such as the feature f2. The facial features of the user 1 include features of a face of the user 1 (FIG. 1). For example, as explained above, the facial tracker 352 identifies the face of the user 1 from the image data 308, or the left eye of the user 1, or the left eyebrow of the user 1, or a lip of the user 1. To illustrate, the facial tracker 352 distinguishes the facial features from remaining features of a body of the user 1.

Moreover, the skeletal tracker 354 receives the image data 308 and identifies skeletal features, such as the features f1 and f3, of the body of the user 1. As an example, in a manner explained above, the skeletal tracker 354 distinguishes the body part, such as the neck or a left hand or a right hand, of the user 1 from other body parts of the user 1.

The control input tracker 356 receives the control input data 310 and identifies control input features, such as a press of a button on the game controller 3 or a movement of a joystick on the game controller 3 (FIG. 1), and the identity of the game controller 3. For example, the control input tracker 356 receives the identity of the game controller 3 and an identification indicating whether the button or joystick was used on the game controller 3 from the game controller 3.

The facial feature classifier 360 receives the facial features that are identified by the facial tracker 352 and classifies the facial features to determines actions performed by the user 1. For example, the facial feature classifier 360 determines that the face of the user 1 has moved to the left by greater than the predetermined amount. As another example, the facial feature classifier 360 determines that the left eyelid of the user 1 has closed for greater than a pre-determined amount of time, which is longer than a normal blink, to determine that the action A2 is performed.

As yet another example, the facial feature classifier 360 determines that the left eyelid of the user 1 closes at a rate slower than a pre-determined rate at which the normal blink occurs to determine that the action A2 is performed. As another example, the facial feature classifier 360 determines that the left eyelid of the user 1 has closed for greater than the pre-determined amount of time and that the left eyelid of the user 1 closes at the rate slower than the pre-determined rate at which the normal blink occurs to determine that the action A2 is performed.

Also, the skeletal feature classifier 362 receives the skeletal features that are identified by the skeletal tracker 354 and classifies the skeletal features. As an example, the skeletal feature classifier 362 determines that the neck of the user 1 has moved in a pre-determined direction, such as left, beyond a pre-determined distance to determine that the action A3 is performed. As another example, the skeletal feature classifier 362 determines that the head of the user 1 is moved and in a pre-determined direction, such as left, beyond a pre-determined distance to determine that the action A1 is performed.

The control input feature classifier 364 classifies the control input features that are identified by the control input tracker 356. For example, the control input feature classifier 364 determines that the joystick of the controller 3 is moved for greater than a pre-determined amount of distance in a pre-determined direction to determine that the action A4 is performed. As another example, the control input features classifier 364 determines that a button on the controller 3 is selected consecutively for multiple times for greater than a predetermined frequency to determine that the action A4 is performed.

The game state classifier 368 accesses, from the memory device 312 (FIG. 3A), a game state 1 associated with the virtual scene 202. Also, the game state classifier 360 receives the actions A1-A4 from the classifiers 360, 362, and 364. The game state 1 includes positions and orientations of the virtual objects 204, 206, 208, and 210 in the virtual scene 202 (FIG. 2). Also, the game state classifier 368 establishes a correspondence between the game state 1 and the actions A1 through A4. The game state classifier 368 provides the correspondence between the actions A1-A4 and the game state 1 to the model 304 to train the model 304. Over time, upon receiving multiple correspondences between multiple actions that are performed by the user 1 and multiple game states of the game 314 (FIG. 3A), the model 304 is trained. For example, the model 304 determines that there is a high probability, which is greater than a pre-determined amount of probability, that the user 3 will control the game controller 3 to move the virtual object 208 in the direction 212 when the user 1 performs the actions A1-A3. Examples of the pre-determined amount of probability include a probability of 50% and a probability of 70%.

Figure 4:
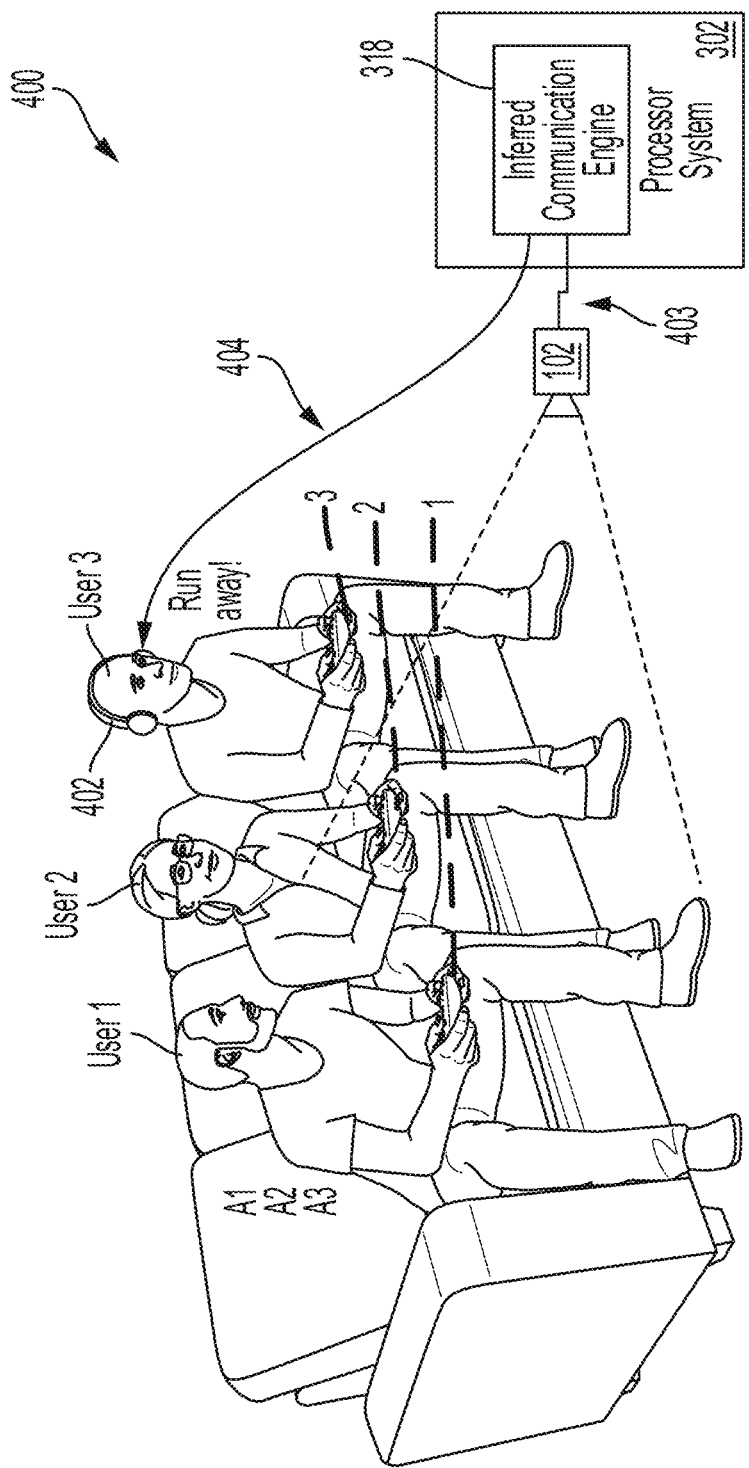
FIG. 4 is a diagram of an embodiment of a system to illustrate communication of audio data from an inferred communication engine to a headphone that is worn by one of the users on his/her head.

FIG. 4 is a diagram of an embodiment of a system 400 to illustrate communication of audio data 404 from the inferred communication engine 318 to a headphone 402 that is worn by the user 3 on his/her head. The system 400 includes a processor system 302 and the camera 102. It should be noted that the user 2 is not shown in FIG. 4 to avoid cluttering FIG. 4. The user 2 is present between the users 1 and 3 in FIG. 4. After the model 304 (FIG. 3B) is trained during the one or more gaming sessions, the users 1 and 3 are playing the game 314 (FIG. 3A) another time, such as during an Nth gaming session. For example, the users 1-3 are playing the game 314 during the first gaming session in which the image data 308 (FIG. 3A) is captured and are playing the game 314 during the $N^{th}$ gaming session in which image data 403 is captured by the camera system 312 (FIG. 3A), where N is an integer greater than one. Each gaming session occurs after logging in by the users 1-3 to their corresponding user accounts. For example, the users 1-3 log into their corresponding user accounts to start one of the one or more gaming sessions and again log into their corresponding user accounts to start the $N^{th}$ gaming session.

During the $N^{th}$ gaming session, again the users 1 and 3 are in the same team and the user 2 is in a different team. During the $N^{th}$ gaming session, the camera 102 captures the image data 403 of the gestures, such as the actions A1-A3, that are performed by the user 1. The gestures performed during the $N^{th}$ gaming session are sometimes referred to herein as additional gestures. The image data 403 captured during the $N^{th}$ gaming session is sometimes referred to herein as additional image data. The image data 403 is captured during a time period in which the virtual objects, 204, 206, 208, and 210 are at the positions and orientations illustrated in the virtual scene 202 (FIG. 2).

However, during the $N^{th}$ gaming session, the user 3 does not notice the actions A1-A3 that are performed by the user 1. For example, the user 3 is not looking at the user 1 to notice the actions A1-A3 but is rather looking at the display device 104 (FIG. 1). As another example, during the $N^{th}$ gaming session, the processor system 302 does not receive control input data, such as the control input data 310C, in response to the actions A1-A3 performed during the $N^{th}$ gaming session. To illustrate, the processor system 302 determines, during the $N^{th}$ gaming session, that the control input data 310C is not generated during the $N^{th}$ gaming session within the pre-determined time period from an end of a time period of generation of the image data 403 during the $N^{th}$ gaming session. In the illustration, a time of generation of the control input data 310C is received with the control input data 310C from the controller 3 by the processor system 302 during the $N^{th}$ gaming session. The controller 3 has the clock source that measures a time at which a joystick of the game controller 3 is moved or a button of the game controller 3 is selected by the user 3 during the $N^{th}$ gaming session. Similarly, the time period of generation of the image data 308 is received with the image data 308 from the camera system 312 by the processor system 302 during the $N^{th}$ gaming session. The classifier 324 (FIG. 3A) determines whether the time of generation of the control input data 310C is within the pre-determined limit from the end of the time period of generation of the image data 308 during the $N^{th}$ gaming session. Upon determining that the time of generation of the input data 310C is not within or outside the pre-determined limit from the end of the time period of generation of the image data 308 during the $N^{th}$ gaming session, the classifier 324 determines that the control input data 310C is not generated during the $N^{th}$ gaming session in response to the image data 308 to further determine that the action A4 is not performed in response to the actions A1-A3 during the $N^{th}$ gaming session.

The inferred communication engine 318 receives the image data 403 captured during the $N^{th}$ gaming session and determines from the image data 403 that the actions A1-A3 are performed by the user 1 during the $N^{th}$ gaming session. The inferred communication engine 318 executes the model 304 to determine the probability that the user 3 will perform the action A4 in response to the actions A1-A3 performed during the $N^{th}$ gaming session. For example, the model 304 is executed to determine that the probability that the user 3 will control the game controller 3 to move the virtual object 208 in the direction 212 to run away from the monster (FIG. 2) during the Nth gaming session. Upon determining that the probability that the user 3 will perform the action A4 in response to the actions A1-A3 performed during the $N^{th}$ gaming session, the inferred communication engine 318 generates audio data 404 including a notification for the user 3. The audio data 404 is an example of a recommendation generated by the inferred communication engine 318. During the $N^{th}$ gaming session, the inferred communication engine 318 sends the audio data 404 to the headphone 402 and to indicate to the user 3 to control the game controller 3 to further control the virtual object 202 to run away in the direction 212. For example, the audio data 404 includes a message "run away". As another example, the audio data 404 includes a message "runaway, a monster is coming". As such, there is secret communication between the users 1 and 3 during the play of the game 314.

The control input data 310C in response to the actions A1-A3 is not received during the $N^{th}$ gaming session until after the model 304 generates the recommendation to send during the $N^{th}$ gaming session. For example, during the $N^{th}$ gaming session, upon listening to sound that is generated based on the audio data 404, the user 3 selects one or more buttons on the game controller 3. Upon selection of the one or more buttons during the $N^{th}$ gaming session, the game controller 3 generates the control input data 310C during the $N^{th}$ gaming session.

In one embodiment, the image data 308 and the image data 403 are generated during the same gaming session. For example, the model is trained based on the image data 308 during a first one of the one or more gaming sessions and the image data 403 is generated during the first one of the one or more gaming sessions.

In an embodiment, the systems and methods for facilitating secret communication between players are helpful to a player with speaking disabilities. For example, the user 1 has a speaking disability, e.g., is mute, or has a speech disorder, or has a speech impediment. The user 1 makes facial gestures, which are analyzed by the processor system 302 to generate the audio data 404, which is provided to the headphone 402 worn by the user 3. As such, the user 1, who has the speaking disability, is able to communicate with the user 3 by making gestures during the play of the game 314. As another example, the user 1 has the speaking disability and is able to express himself/herself using sign language, and the user 3 is a friend or family member of the user 1. The user 3 is capable of understanding the sign language. However, the user 1 is holding his/her game controller 1 while playing the game 314. As such, the user 1 cannot use his/her hands while playing the game 314 to communicate with the user 3 via the sign language. Again, during the play of the game 314, the facial gestures made by the user 1 are analyzed by the processor system 302 in a manner described above to generate the audio data 404, which is sent to the headphone 402 worn by the user 3. This is how the systems and methods described herein facilitate communication between users having speaking disabilities.

Figure 5:
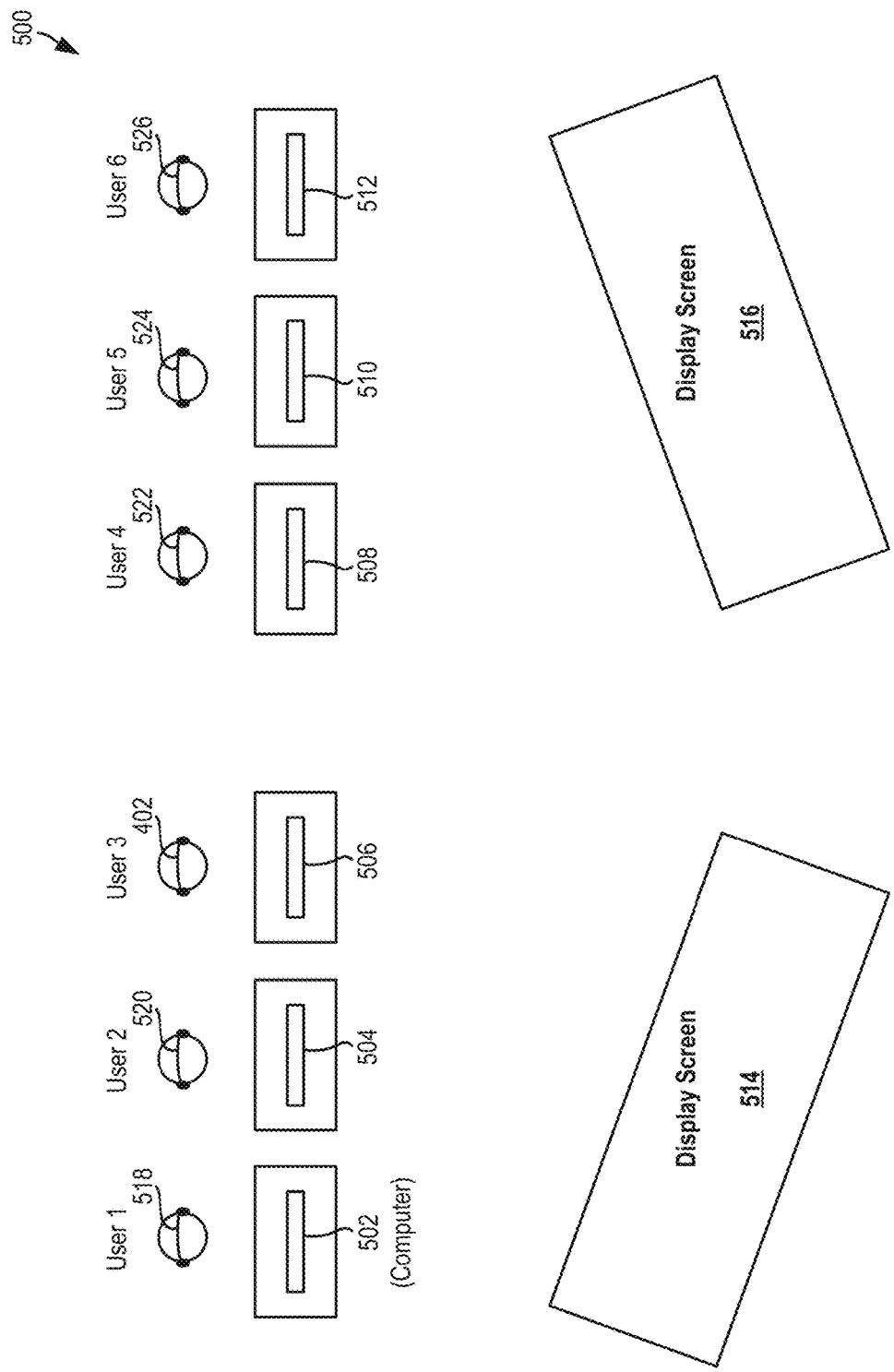
FIG. 5 is a diagram of an embodiment to illustrate a gaming environment associated with electronic sports.

FIG. 5 is a diagram of an embodiment to illustrate a gaming environment 500 associated with electronic sports (Esports). The gaming environment 500 includes multiple computers 502, 504, 506, 508, 510, and 512. Each computer 502-512 is operated by a corresponding user 1, 2, 3, 4, 5, and 6. For example, the computer 502 is operated by the user 1 and the computer 504 is operated by the user 2. To illustrate, the user 1 logs into his/her user account via the computer 502 to access the game 314 (FIG. 3A) and the user 2 logs into his/her user account via the computer 504 to access the game 314.

Each user 1-6 is wearing a headphone in the gaming environment 500. For example, the user 1 is wearing a headphone 518, the user 2 is wearing a headphone 520, the user 3 wearing the headphone 402, the user 4 is wearing a headphone 522, the user 5 is wearing a headphone 524, and the user 6 is wearing a headphone 526. Also, in the gaming environment 500, the users 1 and 3 are in the same team as the user 5, and the users 4, 6, and 2 are in the same team.

The gaming environment 500 includes one or more display screens, such as a display screen 514 and a display screen 516. The display screens 514 and 516 display the game 314 that is played by the users 1-6. For example, the display screens 514 and 516 display the virtual scene 202 (FIG. 2) or another virtual scene that is displayed on display devices of the computers 502, 504 and 506. The gaming environment 500 includes many spectators (not shown) that view the game 314 that is being played by the users 1-6.

The model 304 (FIG. 3A) is executed during the play of the game 314. For example, during the play of the game 314, when the user 1 performs one or more actions, such as the actions A1-A3, the user 3 is prompted via the headphone 402 by the inferred communication engine 318 (FIG. 4) to secretly perform the action A4 or to run away from the monster or to fight back or to dance or to jump or to start collecting grenades. The secret communication between the users 1 and 3 is not noticeable to the user 2, who is in the different team.

Figure 6A:
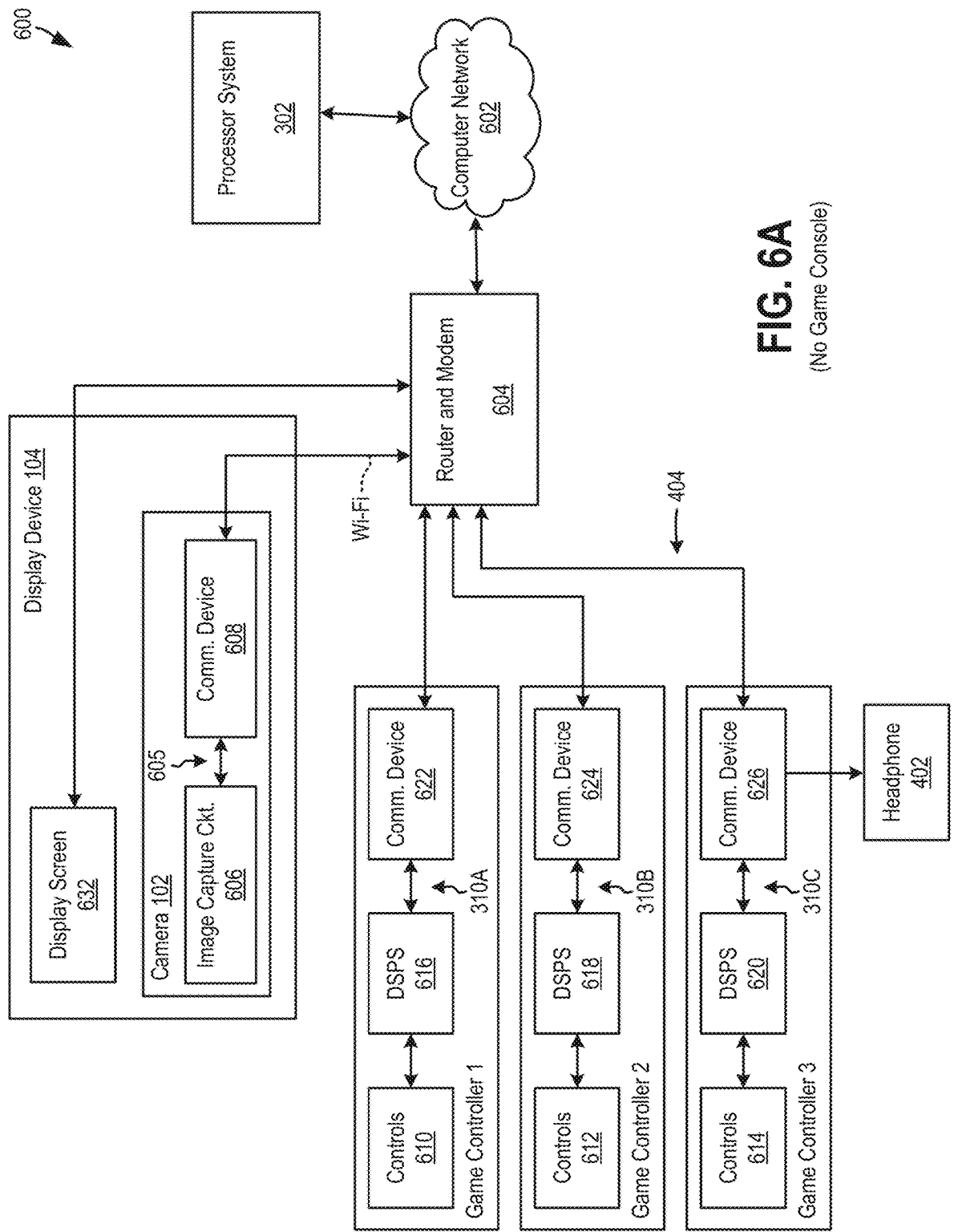
FIG. 6A is a diagram of an embodiment of a system to illustrate a communication via a router and modem and computer network between a processor system and multiple devices, which include a camera and multiple game controllers.

FIG. 6A is a diagram of an embodiment of a system 600 to illustrate a communication via a router and modem 604 and a computer network 602 between the processor system 302 and multiple devices, which include the camera 102 and the game controllers 1, 2, and 3. The system 600 includes the camera 102, the game controllers 1-3, the router and modem 604, the computer network 602, and the processor system 302. The system 600 also includes the headphone 402 and the display device 104. The display device 104 includes a display screen 632, such as an LCD display screen, and LED display screen, or a plasma display screen. An example of the computer network 602 includes the Internet or an intranet or a combination thereof. An example of the router and modem 604 includes a gateway device. Another example of the router and modem 604 includes a router device and a modem device.

The camera 102 includes an image capture circuit 606 and a communication device 608. Details of the image capture circuit 606 are provided below. The image capture circuit 606 is coupled to the communication device 608, which is coupled to the router and modem 604 via a wireless connection. Examples of a wireless connection include a Wi-Fi™ connection and a Bluetooth™ connection. The display screen 632 is coupled to the router and modem 604 via a wired connection. Examples of a wired connection, as used herein, include a transfer cable, which transfers data in a serial manner, or in a parallel manner, or by applying a universal serial bus (USB) protocol.

The game controller 1 includes controls 610, a digital signal processor system (DSPS) 616, and a communication device 622. The controls 610 are coupled to the DSPS 616, which is coupled to the communication device 622. Similarly, the game controller 2 includes controls 612, a DSPS 618, and a communication device 624. The controls 612 are coupled to the DSPS 618, which is coupled to the communication device 624. Also, the game controller 3 includes controls 614, a DSPS 620, and a communication device 626. The controls 614 are coupled to the DSPS 620, which is coupled to the communication device 626.

Examples of the each of the controls 610, 612, and 614 include buttons and joysticks. Examples of each of the communication devices 608, 622, 624 and 626 include a communication circuit that enables communication using a wireless protocol, such as Wi-Fi™ or Bluetooth™, between the communication device and the router and modem 604. Other examples of each of the communication devices 608, 622, 624 and 626 include a communication circuit that enables communication using a wired protocol, such as a serial transfer protocol, a parallel transfer protocol, or the USB protocol.

The communication devices 622, 624, and 626 are coupled to the router and modem 604 via a corresponding wireless connection, such as Wi-Fi™ or Bluetooth™ wireless connection. The communication device 626 is coupled to the headphone 402 via a wired connection or a wireless connection. Examples of a wireless connection, as used herein, include a connection that applies a wireless protocol, such as a Wi-Fi™ or Bluetooth™ protocol. The router and modem 604 is coupled to the computer network 602, which is coupled to the processor system 302.

During the play of the game 314 (FIG. 3A), the processor system 302 generates image frame data from one or more game states of the game 314 and applies a network communication protocol, such as transfer control protocol over Internet protocol (TCP/IP), to the image frame data to generate one or more packets and sends the packets via the computer network 602 to the router and modem 604. The modem of the router and modem 604 applies the network communication protocol to the one or more packets received from the computer network 602 to obtain or extract the image frame data, and provides the image frame data to the router of the router and modem 604. The router routes the image frame data via the wired connection between the router and the display screen 632 to the display screen 632 for display of one or more images of the game 314 based on the image frame data received within the one or more packets.

During the display of one or more images of the game 314, the image capture circuit 606 captures one or more images of the real-world objects, such as images of the users 1-3 (FIG. 1), in front of the camera 102 to generate image data 605, such as the image data 308 generated during the one or more gaming sessions or the image data 403 generated during the Nth gaming session, and provides the image data 605 to the communication device 608. The communication device 608 applies the wireless protocol to the image data 605 to generate one or more wireless packets and sends the wireless packets to the router and modem 604.

The controls 614 of the game controller 3 are selected or moved by the user 3 to generate the control input signals, which are processed by the DSPS 620. The DSPS 620 processes, such as measures or samples or filters or amplifies or a combination thereof, the control input signals to output the control input data 310C. For example, the DSPS 620 identifies a button of the game controller 3 selected by the user 3. As another example, the DSPS 620 identifies whether a joystick of the game controller 3 is moved or a button of the game controller 3 is selected by the user 3. The control input data 310C is sent from the DSPS 620 to the communication device 626. The communication device 626 applies the wireless protocol to the control input data 310 to generate one or more wireless packets and sends the wireless packets to the router and modem 604. In a similar manner, wireless packets are generated by the communication devices 622 and 624 of the game controllers 1 and 2.

The router of the router and modem 604 receives the wireless packets from the communication devices 608, 622, 624, and 626, and applies the wireless protocol to obtain or extract the image data 605 and the control input data 310 from the wireless packets. The router of the router and modem 604 provides the image data 605 and the control input data 310 to the modem of the router and modem 604. The modem applies the network communication protocol to the image data 605 and the control input data 310 to generate one or more network packets. For example, the modem determines that the image data 605 and the control input data 310B sent to the processor system 302 that is executing the game 314, and embeds a network address of the processor system 302 within the one or more network packets. The modem sends the one or more network packets via the computer network 602 to the processor system 302.

The processor system 302 applies the network communication protocol to the one or more network packets received from the router and modem 604 to obtain or extract the image data 605 and the control input data 310, and processes the image data 605 and the control input data 310 in a manner explained above to train the model 304. The processor system 302 generates the audio data 404 (FIG. 4) and applies the network communication protocol to the audio data 404 to generate one or more network packets. The processor system 302 sends the one or more network packets via the computer network 602 to the router and modem 604.

The modem of the router and modem 604 applies the network communication protocol to the one or more network packets received via the computer network 602 to obtain or extract the audio data 404. The router of the router and modem 604 applies the wireless protocol to the audio data 404 to generate one or more wireless packets and sends the wireless packets to the communication device 626 of the game controller 3. The communication device 626 of the game controller 3 applies the wireless protocol to the one or more wireless packets received from the router and modem 604 to obtain or extract the audio data 404 and sends the audio data 404 to the headphone 402 for output of the audio data 404 as sound to the user 3. For example, the communication device 626 of the game controller 3 applies the wired protocol to generate one or more packets having the audio data 404 and sends the one or more packets via the wired connection to the headphone 402. As another example, the communication device 626 of the game controller 3 applies the wireless protocol to generate one or more wireless packets and sends the one or more wireless packets via the wireless connection to the headphone 402.

In one embodiment, each communication device 608, 622, 624, and 626 communicates with the router and modem 604 via a wired connection, such as a cable.

In one embodiment, the display screen 632 is coupled to the router and modem 604 via the communication device 608. For example, the display screen 632 is coupled to the communication device 608. The router 604 applies the wireless protocol to the image frame data received via the computer network 602 to generate one or more wireless packets and sends the one or more wireless packets to the communication deice 608. The communication device 608 applies the wireless protocol to the one or more wireless packets to extract or obtain the image frame data and sends image frame data to the display screen 632 for display of one or more images of the game 314.

Figure 6B:
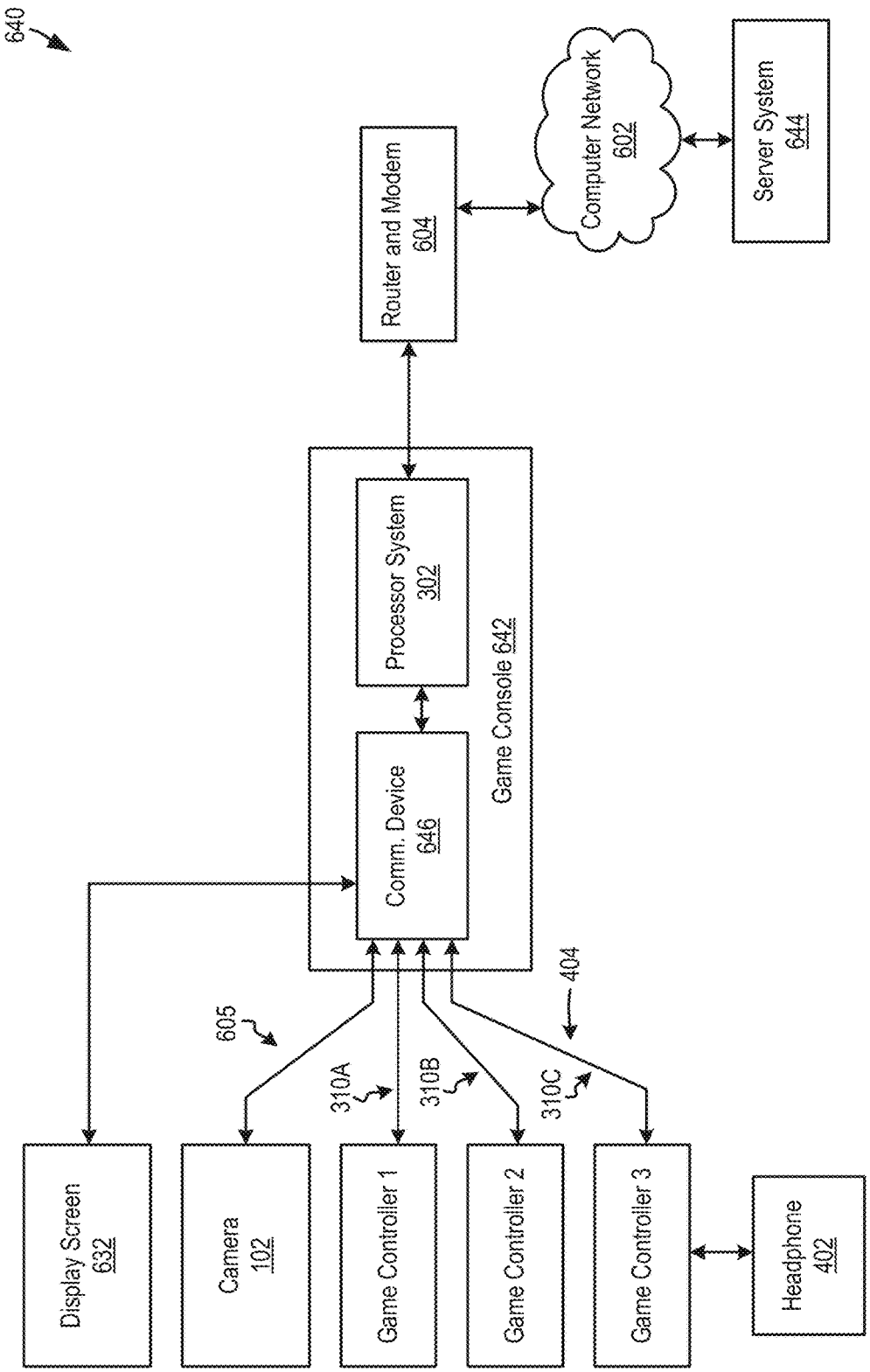
FIG. 6B is a diagram of an embodiment of a system to illustrate a communication between the processor system and the multiple devices via the computer network, the router and modem, a game console, and a server system.

FIG. 6B is a diagram of an embodiment of a system 640 to illustrate a communication between the processor system 302 and multiple devices that include the camera 102 and the game controllers 1-3 via the computer network 602, the router and modem 604, a game console 642, and a server system 644. An example of the game console 642 is a video game console or a computer or a combination of a central processing unit (CPU) and a graphics processing unit (GPU). To illustrate, the game console 642 is a Sony PlayStation™ or a Microsoft Xbox™. The game console 642 includes the processor system 302 and a communication device 646, such as Wi-Fi™ communication device or a Bluetooth™ communication device. As an example, a processor system as used herein, includes one or more CPUs and one or more GPUs, and the one or more CPUs are coupled to the one or more GPUs.

An example of the server system 644 includes one or more servers within one or more data centers. A server, as used herein, and can be a game console. As an example, the server system 644 includes one or more virtual machines. The communication device 646 is coupled to the communication device 608 (FIG. 6A) of the camera 102 via a wireless connection, such as a Wi-Fi™ connection or a Bluetooth™ connection. Moreover, the communication device 646 is coupled to the communication device 622 of the game controller 1 via a wireless connection, is coupled to the communication device 624 of the game controller 2 via a wireless connection, and is coupled to the communication device 626 of the game controller 3 via a wireless connection. The communication device 646 is coupled to the processor system 302, such as the AI processor 306 (FIG. 3A) and one or more game processors, such as a CPU and a GPU, that execute the game 314 (FIG. 3A). The processor system 302 is coupled to the router and modem 604 via a wired connection. The router and modem 604 is coupled via the computer network 602 to the server system 644.

The processor system 302 instead of or in conjunction with the server system 644 executes the game 314 for display of virtual scenes on the display screen 632. For example, in response to receiving login information that is provided by the user 1 via the game controller 1, the processor system 302 sends a request to the server system 644 via the computer network 602 to determine whether the login information is valid. Upon receiving an indication from the server system 644 via the computer network 602 that the login information received from the game controller 1 is valid, the processor system 302 executes the game 314 for play of the game 314 by the user 1 via the game controller 1 and the game console 642. On the other hand, upon receiving an indication from the server system 644 via the computer network 602 that the login information received from the game controller 1 is invalid, the processor system 302 does not execute the game 314 for play by the user 1 via the game controller 1 and the game console 642.

Similarly, as another example, in response to receiving login information that is provided by the user 3 via the game controller 3, the processor system 302 sends a request to the server system 644 via the computer network 602 to determine whether the login information is valid. Upon receiving an indication from the server system 644 via the computer network 602 that the login information received from the game controller 3 is valid, the processor system 302 executes the game 314 for play of the game 314 by the user 3 via the game controller 3 and the game console 642. On the other hand, upon receiving an indication from the server system 644 via the computer network 602 that the login information received from the game controller 3 is invalid, the processor system 302 does not execute the game 314 for play by the user 3 via the game controller 3 and the game console 642.

The communication device 646 receives the wireless packets having the image data 605 and the control input data 310 from the camera 102 and the game controllers 1-3, and applies the wireless protocol to the wireless packets to extract the image data 605 and the control input data 310 from the wireless packets, and provides the image data 605 and the control input data 310 to the processor system 302. The processor system 302 trains the model 304 (FIG. 3A) based on the image data 605 and the control input data 310 in a manner described above, and generates the audio data 404. The processor system 304 provides the audio data 404 to the communication device 646. The communication device 646 applies the wireless protocol to the audio data 404 to generate one or more wireless packets and sends the wireless packets to the communication device 626 of the game controller 3.

In one embodiment, some of the functions described herein as being performed by the processor system 302 are performed by a processor system of the game console 642 and the remaining functions, described herein as being performed by the processor system 302, are instead performed by the server system 644.

FIG. 6C is a diagram of an embodiment of a system 660 to illustrate communication between the processor system 302 including the model 304 (FIG. 3A) and multiple smart phones 1, 2, and 3. The system 660 includes the smart phones 1, 2, and 3, the router and modem 604, the computer network 602, the processor system 302, and the headphone 402. The smartphones 1-3 are coupled to the router and modem 604, which is coupled via the computer network 602 to the processor system 302. Each of the smart phones 1-3 is coupled to the router and modem 604 via a wireless connection, such as a Wi-Fi™ connection or a Bluetooth™ connection. The headphone 402 is coupled to the smart phone 3 via a wired connection or a wireless connection.

The user 1 operates the smart phone 1. Similarly, the user 2 operates the smart phone 2 and the user 3 operates the smart phone 3. Each of the smart phones 1, 2, and 3 displays the game 314 (FIG. 3A), which is being executed by the processor system 302. For example, each of the smart phones 1-3 displays a virtual scene of the game 314. Each smart phone 1-3 has a camera for capturing an image of the real-world objects within a field-of-view of the camera.

During the play of the game 314, the smart phone 1 generates the control input data 310A when operated by the user 1. For example, the smart phone 1 displays a virtual joystick and one or more virtual buttons on its display device. When the virtual joystick board the one or more virtual buttons are used by the user 1, the control input data 310A is generated. Also, the camera of the smart phone 1 captures the image data 605 of the gestures that are performed by the user 1. Similarly, during the play of the game 314, the smart phone 2 generates the control input data 310B when operated by the user 2, and the smart phone 3 generates a control input data 310C when operated by the user 3.

The smart phone 1 applies a wireless protocol to packetize the image data 605 into one or more wireless packets and the one or more wireless packets are sent from the smart phone 1 to the router and modem 604. The router and modem 604 performs the functions described above to obtain the image data 605 and to generate one or more network packets including the image data 605, and sends the one or more network packets via the computer network 602 to the processor system 302.

Also, the smart phone 3 applies a wireless protocol to packetize the control input data 310C into one or more wireless packets and the one or more wireless packets are sent from the smart phone 3 to the router and modem 604. The router and modem 604 performs the functions described above to obtain the control input data 310C and to generate one or more network packets including the control input data 310C, and sends the one or more network packets via the computer network 602 to the processor system 302.

The processor system 302 receives the network packets having the image data 605 and the control input data 310C, trains the model 304 as explained in the manner described above, and generates the audio data 404. The processor system 302 packetizes the audio data 404 into one or more network packets and sends the one or more network packets via the computer network 602 to the router and modem 604. The router and modem 604 performs the functions described above to obtain the audio data 404 from the one or more network packets, and generates and sends one or more wireless packets including the audio data 404 to the smart phone 3.

The smart phone 3 receives the one or more wireless packets, applies the wireless protocol to the one or more wireless packets to extract or obtain the audio data 404, and provides the audio data 404 to the headphone 402 via the wireless or wired connection. For example, the smart phone 3 applies the wired protocol to generate one or more packets having the audio data 404 and sends the one or more packets via the wired connection to the headphone 402. As another example, the smart phone 3 applies the wired protocol to generate one or more wireless packets and sends the one or more wireless packets via the wireless connection to the headphone 402. The headphone 402 outputs sound representing the audio data 404 to the user 3 to secretly communicate a message from the user 1 to the user 3.

In one embodiment, instead of a smart phone, a game computer, such as a desktop computer, or a laptop computer, or a tablet, is used.

In one embodiment, instead of a smart phone, a head-mounted display (HMD) is used. For example, the user 1 is wearing an HMD on his/her head, the user 2 is wearing an HMD on his/her head, and the user 3 is wearing an HMD 3 on his/her head. Each HMD is used with a corresponding game controller. For example, the HMD worn by the user 1 is used with the game controller 1 and the HMD worn by the user 2 is used with the game controller 2.

In an embodiment, a smart phone acts as a game controller. For example, the user 1 is wearing his/her HMD and using the smart phone 1 as a game controller, and the user 2 is wearing his/her HMD and using the smart phone 2 as a game controller.

Figure 6D:
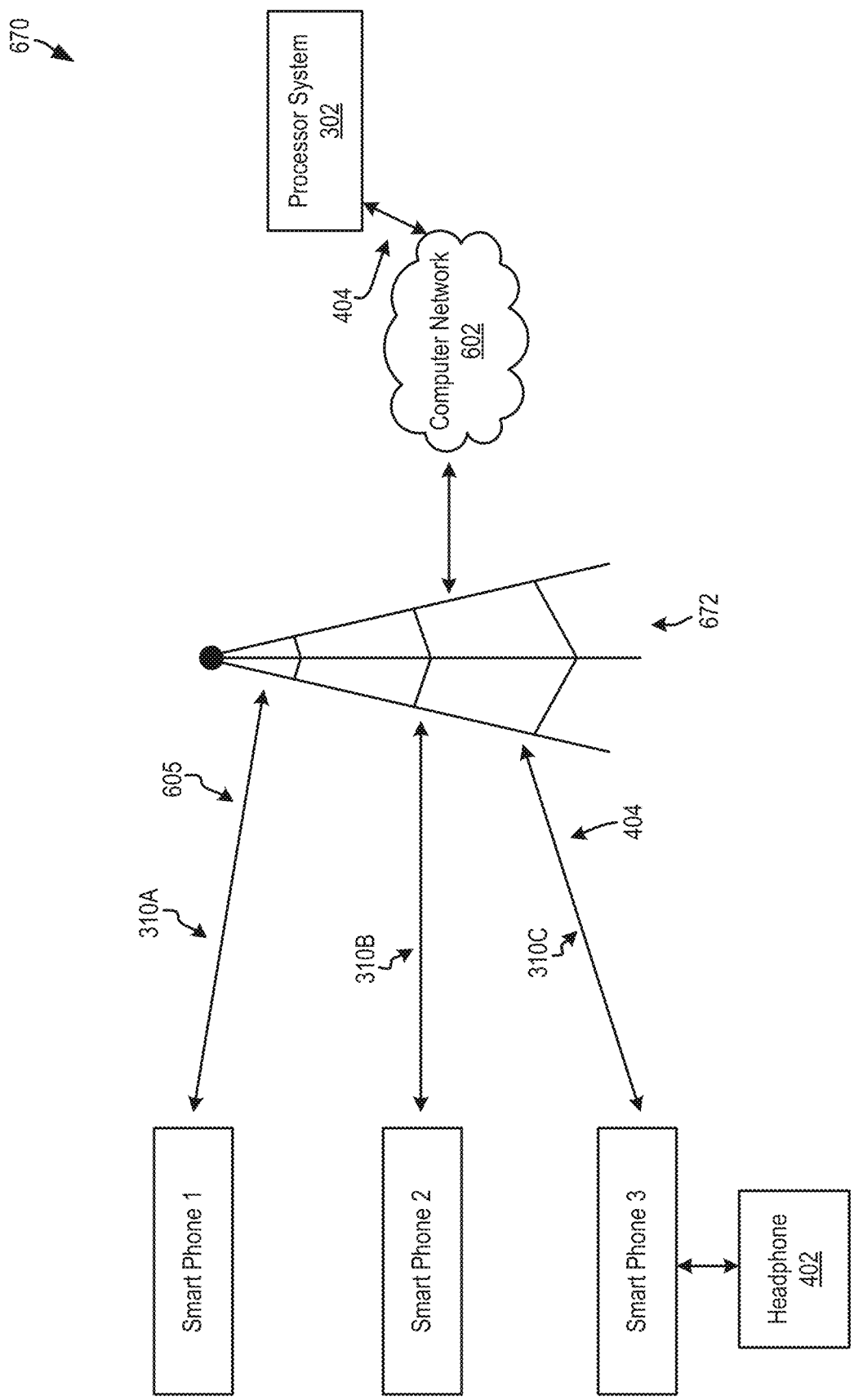
FIG. 6D is a diagram of an embodiment of a system to illustrate communication between the smart phones and the processor system via the computer network without using the router and modem between the computer network and the smart phones.

FIG. 6D is a diagram of an embodiment of a system 670 to illustrate communication between the smart phones 1-3 and the processor system 404 via the computer network 602 without using the router and modem 602 between the computer network 602 and the smart phones 1-3. The system 670 includes the smart phones 1-3, a cellular network 672, the headphone 402, the computer network 602, and the processor system 302.

Each smart phone 1-3 is coupled to the cellular network 672 via a cellular wireless connection, such as a fourth-generation cellular wireless (4G) connection or a fifth cellular wireless (5G) connection. The cellular network 672 is coupled to the computer network 602, which is coupled to the processor system 302.

The smart phone 1 generates one or more packets by applying a cellular communication protocol, such as the 4G or the 5G protocol, to the image data 308 and sends the one or more packets to the cellular network 672. The cellular network 672 receives the one or more packets and applies the cellular communication protocol to obtain or extract the image data 605, and applies the network communication protocol to the image data 605 to generate one or more network packets. The one or more network packets generated by the cellular network 672 are sent via the computer network 602 to the processor system 302. The processor system 302 processes the one or more network packets received from the cellular network 602 in a manner described above to generate the audio data 404, and sends one or more network packets including the audio data 404 via the computer network 602 to the cellular network 672.

The cellular network 672 applies the network communication protocol to the one or more network packets received from the processor system 302 to extract or obtain the audio data 404, and applies the cellular communication protocol to the audio data 404 to generate one or more packets. The cellular network 672 sends the one or more packets including the audio data 404 to the smart phone 3.

Figure 7A:
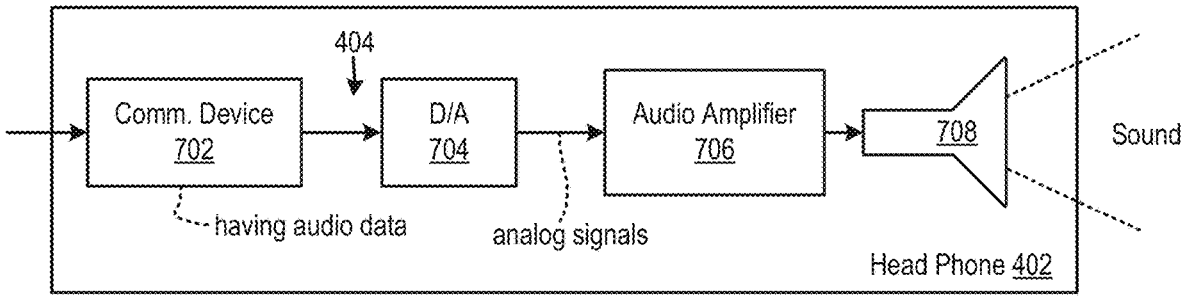
FIG. 7A is a diagram of an embodiment of the headphone.

FIG. 7A is a diagram of an embodiment of the headphone 402. The headphone 402 includes a communication device 702, a digital-to-analog (D/A) converter 704, an audio amplifier 706, and a speaker 708. An example of the communication device 702 is a communication circuit that applies the wire protocol or the wireless protocol.

The communication device 702 is coupled to the communication device 626 (FIG. 6A) of the game controller 3 or to the smart phone 3 (FIG. 6C). The digital-to-analog converter 704 is coupled to the communication device 702 and the audio amplifier 706 is coupled to the digital-to-analog converter 704. Also, the speaker 708 is coupled to the audio amplifier 706.

The communication device 702 receives one or more packets having the audio data 404 from the communication device 626 or from the smart phone 3, and applies a protocol, such as the wired protocol or the wireless protocol, to extract or obtain the audio data 404 from the one or more packets. The communication device 702 sends the audio data 404 to the digital-to-analog converter 704. The digital-to-analog converter 704 converts the audio data 404 from a digital format to an analog format to output analog audio signals. The digital-to-analog converter 704 sends the analog audio signals output based on the audio data 404 to the audio amplifier 706. The audio amplifier 706 amplifies, such as increases an amplitude or a magnitude, of the analog audio signals to output amplified audio signals, which are electrical signals. The speaker 708 converts electrical energy of the amplified audio signals into sound energy to output sounds to be heard by the user 3 (FIG. 1).

In one embodiment, instead of the speaker 708, multiple speakers are used.

Figure 7B:
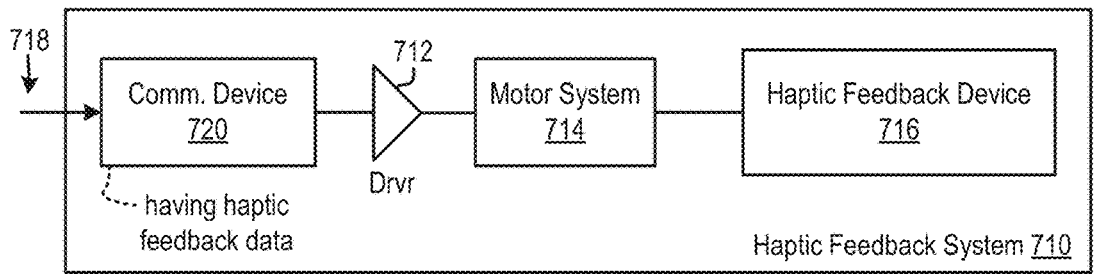
FIG. 7B is a diagram of an embodiment of a haptic feedback system to illustrate that instead of audio data, haptic feedback data is received by the haptic feedback system to provide haptic feedback to the one of the users.

FIG. 7B is a diagram of an embodiment of a haptic feedback system 710 to illustrate that instead of the audio data 404, haptic feedback data 718 is received by the haptic feedback system 710 to provide haptic feedback to the user 3 (FIG. 1). The haptic feedback data 718 is another example of the recommendation generated by the inferred communication engine 318. The haptic feedback system 710 includes a communication device 720, a driver system 712, a motor system 714, and a haptic feedback device 716. An example of the communication device 720 is a communication circuit that applies the wired or wireless protocol. To illustrate, the communication device 626 (FIG. 6A) is an example of the communication device 720. For example, when the haptic feedback system 710 is embedded within the game controller 3, the communication device 626 is an example of the communication device 720. As another illustration, the communication device 626 (FIG. 6A) is a part of the smart phone 3. For example, when the haptic feedback system 710 is embedded within the smart phone 3, the communication device 626 is an example of a wireless access card (WAC) of the smart phone 3. An example of the driver system 712 includes one or more transistors, and the transistors are coupled to each other. An example of the motor system 714 includes one or more electric motors, such as direct current (DC) motors or alternating current (AC) motors. Each electric motor includes a stator and a rotor. An example of the haptic feedback device 716 includes a metal object or a plastic object that is in contact with the user 3.

Instead of or in addition to generating the audio data 404, the processor 302 generates the haptic feedback data 718 based on the training of the model 304 (FIG. 3A). The processor system 302 generates one or more packets having the haptic feedback data 718 in the same manner in which the processor system 302 generates one or more packets having the audio data 404 and sends the haptic feedback data 718 for receipt by the communication device 720. For example, with reference to FIG. 6A, the processor system 302 applies the network communication protocol to the haptic feedback data 718 to generate one or more network packets and sends the one or more network packets via the computer network 602 to the router and modem 604. The router and modem 604 processes the one or more network packets having the haptic feedback data 718 in the same manner in which the router and modem 604 processes the one or more network packets having the audio data 404, and applies the wireless protocol to the haptic feedback data 718 to generate one or more wireless packets, and sends the one or more wireless packets to the communication device 626 of the game controller 3. As another example, with reference to FIG. 6B, the processor system 302 of the game console 642 applies the wireless protocol to the haptic feedback data 718 to generate one or more wireless packets, and sends the one or more wireless packets to the communication device 626 of the game controller 3. As yet another example, with reference to FIG. 6C, the router and modem 604 processes the one or more network packets having the haptic feedback data 718 in the same manner in which the router and modem 604 processes the one or more network packets having the audio data 404, and applies the wireless protocol to the haptic feedback data 718 to generate one or more wireless packets, and sends the one or more wireless packets to the smart phone 3. As another example, with reference to FIG. 6D, the cellular network 672 receives one or more network packets having the haptic feedback data 718 via the computer network 602 from the processor system 302 to obtain the haptic feedback data 718 from the one or more network packets, and applies the cellular communication protocol to the haptic feedback data 718 to generate one or more packets. The cellular network 672 sends the one or more packets having the haptic feedback data 718 to the smart phone 3.

Referring back to FIG. 7B, the communication device 720 receives one or more packets having the haptic feedback data 718 and applies a protocol, such as the wired protocol, or the wireless protocol, or the cellular communication protocol, to extract or obtain the haptic feedback data 718 from the one or more packets, and sends the haptic feedback data 718 to the driver system 712. Upon receiving the haptic feedback data 718, the driver system 712 generates one or more current signals and applies the one or more current signals to corresponding one or more electric motors of the motor system 714. The one or more rotors of the one or more electric motors of the motor system 714 rotate to move, such as vibrate, the haptic feedback device 716. When the haptic feedback device 716 is in contact with the user 3, the user 3 feels to the motion or moment of the haptic feedback device 716.

Figure 7C:
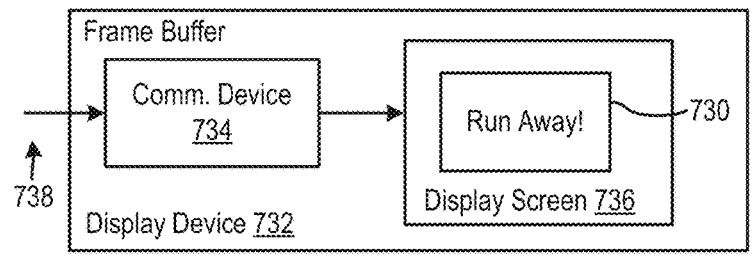
FIG. 7C is a diagram of an embodiment of a display device to illustrate a display of a message on a display screen.

FIG. 7C is a diagram of an embodiment of a display device 732 to illustrate a display of a message 730 on a display screen 736. The display device 732 includes a communication device 734 and the display screen 736. Examples of the display device 732 include an LCD display device, an LED display device, and a plasma display device. Examples of the display screen 736 include an LCD display screen, and LED display screen, and a plasma display screen. To illustrate, the display device 732 is a display device of the smart phone 3 (FIG. 6C) or of the game controller 3 or of a tablet or of a computer. Examples of a computer include a desktop computer and a laptop computer. Examples of the communication device 734 include a communication circuit that applies the wired or wireless protocol for communication of data. The communication device 734 is coupled to the display screen 736. The communication device 626 (FIG. 6A) is an example of the communication device 734.

Instead of or in addition to generating other forms of data, such as the audio data 404 and the haptic feedback data 718, the processor system 302 generates image frame data 738 based on the training of the model 304 (FIG. 3A). The image frame data 738 is another example of the recommendation generated by the inferred communication engine 318. In the same manner in which the processor system 302 generates one or more packets having the audio data 404, the processor system 302 generates one or more packets by applying a protocol, such as the network communication protocol, the wired protocol, or the wireless protocol, to the image frame data 738 and sends the one or more packets to the display device 732. For example, with reference to FIG. 6A, the processor system 302 applies the network communication protocol to the image frame data 738 to generate one or more network packets and sends the one or more network packets via the computer network 602 to the router and modem 604. The router and modem 604 processes the one or more network packets having the image frame data 738 in the same manner in which the router and modem 604 processes the one or more network packets having the audio data 404 to obtain the image frame data 738 from the one or more network packets, applies the wireless protocol to the image frame data 738 to generate one or more wireless packets, and sends the one or more wireless packets to the communication device 626. As another example, with reference to FIG. 6B, the processor system 302 of the game console 642 applies the wireless protocol to the image frame data 738 to generate one or more wireless packets, and sends the wireless packets to the communication device 626 of the game controller 3. As yet another example, with reference to FIG. 6C, the router and modem 604 processes the one or more network packets having the image frame data 738 in the same manner in which the router and modem 604 processes the one or more network packets having the audio data 404 to obtain the image frame data 738, applies the wireless protocol to the image frame data 738 to generate one or more wireless packets, and sends the one or more wireless packets to the smart phone 3. As another example, with reference to FIG. 6D, the cellular network 672 receives one or more network packets having the image frame data 738 via the computer network 602 from the processor system 302 and applies the network communication protocol to extract the image frame data 738 from the one or more network packets, and applies the cellular communication protocol to the image frame data 738 to generate one or more packets. The cellular network 672 sends the one or more packets having the image frame data 738 to the smart phone 3.

Referring back to FIG. 7C, the communication device 734 receives the one or more packets having the image frame data 738 and applies a protocol, such as the cellular communication protocol, the wired protocol, or the wireless protocol, to extract or obtain the image frame data 738 from the one or more packets, and sends the image frame data 738 to the display screen 736. Upon receiving the image frame data 738, the display screen 736 displays the message 730. When the user 3 views the message 730, such as "Run Away!", the user 3 controls the virtual object 208 to run away in the direction 212 (FIG. 2).

Figure 8:
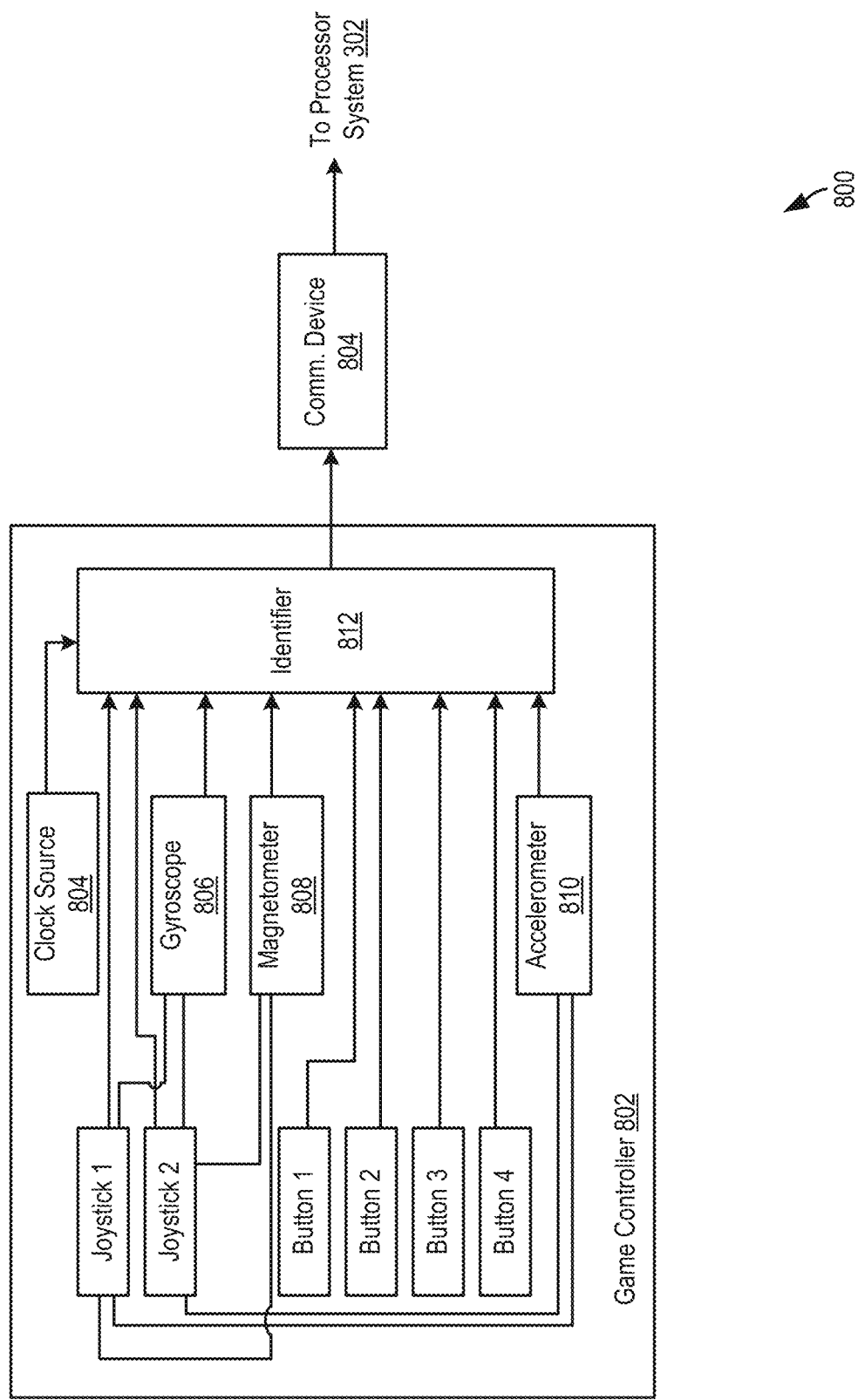
FIG. 8 is a diagram of an embodiment of a system to illustrate components of one of the game controllers.

FIG. 8 is a diagram of an embodiment of a system 800 to illustrate components of a game controller 802. The system 800 includes the game controller 802 and a communication device 804. Any of the game controllers 1-3 is an example of the game controller 802. Examples of the communication device 804 include a communication circuit that applies a protocol, such as the cellular communication protocol, or the wired protocol, or the wireless protocol. The game controller 802 includes joysticks 1 and 2, and multiple buttons 1, 2, 3, and 4. Also, the game controller 802 includes a clock source 804, a gyroscope 806, a magnetometer 808, and an accelerometer 810. The game controller 802 includes an identifier circuit 812. An example of the clock source 804 includes a clock oscillator or an electronic oscillator or a digital pulse generator. An example of the identifier 812 includes a combination of an analog-to-digital converter and a processor, such as a programmable logic device (PLD), an application specific integrated circuit (ASIC), or a digital signal processor (DSP). To illustrate, the identifier 812 includes an analog-to-digital converter that is coupled to the PLD or the ASIC or the DSP. As another example, any of the DSPS 616, 618, and 620 (FIG. 6A) is an example of the identifier 812. Also, the identifier 812 has a clock input for receiving a clock signal from the clock source 804.

Each of the joystick 1 and the joystick 2 is coupled to the gyroscope 806. Moreover, each of the joystick 1 and the joystick 2 is coupled to the magnetometer 808. Each of the joystick 1 and the joystick 2 is coupled to the accelerometer 810. Each of the clock source 804, joystick 1, the joystick 2, the button 1, the button 2, the button 3, the button 4, the gyroscope 806, the magnetometer 808, and the accelerometer 810 are coupled to the identifier 812. The identifier 812 is coupled to the communication device 804.

The identifier 812 operates in synchronization with the clock signal generated by the clock source 804. When one or more of the joysticks 1 and 2 are moved by a user, such as the user 3, the gyroscope 806, and the magnetometer 808, and the accelerometer 810 generate one or more analog signals representing position and orientation information of the one or more of the joysticks 1 and 2, and send the one or more analog signals to the identifier 812. The position and orientation information of a joystick includes a position, such as an (x, y, z) co-ordinate, with respect to a reference co-ordinate, e.g., (0, 0, 0), that is located at a point on the game controller 802, and the joystick moves with respect to or about the point. It should be noted that the location of the point is at an intersection of an x-axis, a y-axis, and a z-axis. The position and orientation information of the joystick includes an orientation, such as (θ, φ, γ), of the joystick. The angle θ of the joystick is with respect to the x-axis, the angle φ of the joystick is with respect to the y-axis, and the angle γ of the joystick is with respect to the z-axis. The analog-to-digital converter of the identifier 812 converts the one or more analog signals to corresponding one or more digital signals, and the processor of the identifier 812 processes the one or more digital signals to determine the position and orientation information of one or more of the joysticks 1 and 2.

Moreover, the identifier 812 receives one or more analog signals that are generated when one or more of the joysticks 1 and 2 are moved by the user and the analog-to-digital converter of the identifier 812 converts the analog signals to corresponding one or more digital signals. The processor of the identifier 812 receives the one or more digital signals identifying one or more of the joysticks 1 and 2 that are moved, and processes the one or more digital signals to identify the one or more of the joysticks. For example, when the processor of the identifier 812 receives a digital signal via a first channel, such as a wire, that couples the joystick 1 to the identifier 812, the processor determines that the joystick 1 is moved. When the processor of the identifier 812 receives a digital signal via a second channel, such as a wire, that couples the joystick 2 to the identifier 812, the processor determines that the joystick 2 is moved. The processor of the identifier 812 measures, based on the clock signal, a time at which the joystick 1 is moved by the user and a time at which the joystick 2 is moved by the user.

Similarly, the identifier 812 receives one or more analog signals that are generated when one or more of the buttons 1-4 are selected by the user and the analog-to-digital converter of the identifier 812 converts the analog signals to corresponding one or more digital signals. The processor of the identifier 812 receives the one or more digital signals identifying one or more of the buttons 1-4 that are selected, and processes the one or more digital signals to identify the one or more of the buttons 1-4. For example, when the processor of the identifier 812 receives a digital signal via a third channel, such as a wire, that couples the button 1 to the identifier 812, the processor determines that the button 1 is selected. When the processor of the identifier 812 receives a digital signal via a fourth channel, such as a wire, that couples the button 2 to the identifier 812, the processor determines that the button 2 is selected. The processor of the identifier 812 measures, based on the clock signal, a time at which any of the buttons 1-4 is selected by the user. The identity of the game controller 802, the identification of one or more of the joysticks 1 and 2 that are moved, the identification of one or more of the buttons 1-4 that are selected, the times at which one or more of the joysticks 1 and 2 are moved, the times at which one or more of the buttons 1-4 are selected, and the position and orientation information of one or more of the joysticks 1 and 2 that are moved is an example of the control input data 310A, or the control input data 310B, or the control input data 310C.

The identifier 812 provides the control input data 310A, 310B, or 310C to the communication device 804. The communication device 804 applies the protocol, such as the cellular communication protocol, or the wired protocol, or the wireless protocol, to the control input data 310A, 310B, or 310C to generate one or more packets, and sends the one or more packets to the processor system 302. For example, with reference to FIG. 6A, the communication device 622 applies the wireless protocol to the control input data 310A to generate one or more wireless packets and sends the wireless packets to the router and modem 604. As another example, with reference to FIG. 6A, the communication device 626 applies the wireless protocol to the control input data 310C to generate one or more wireless packets and sends the wireless packets to the router and modem 604.

In one embodiment, the communication device 804 is a part of or located within the game controller 802. For example, any of the communication devices 622, 624, and 626 (FIG. 6A) is an example of the communication device 804.

Figure 9:
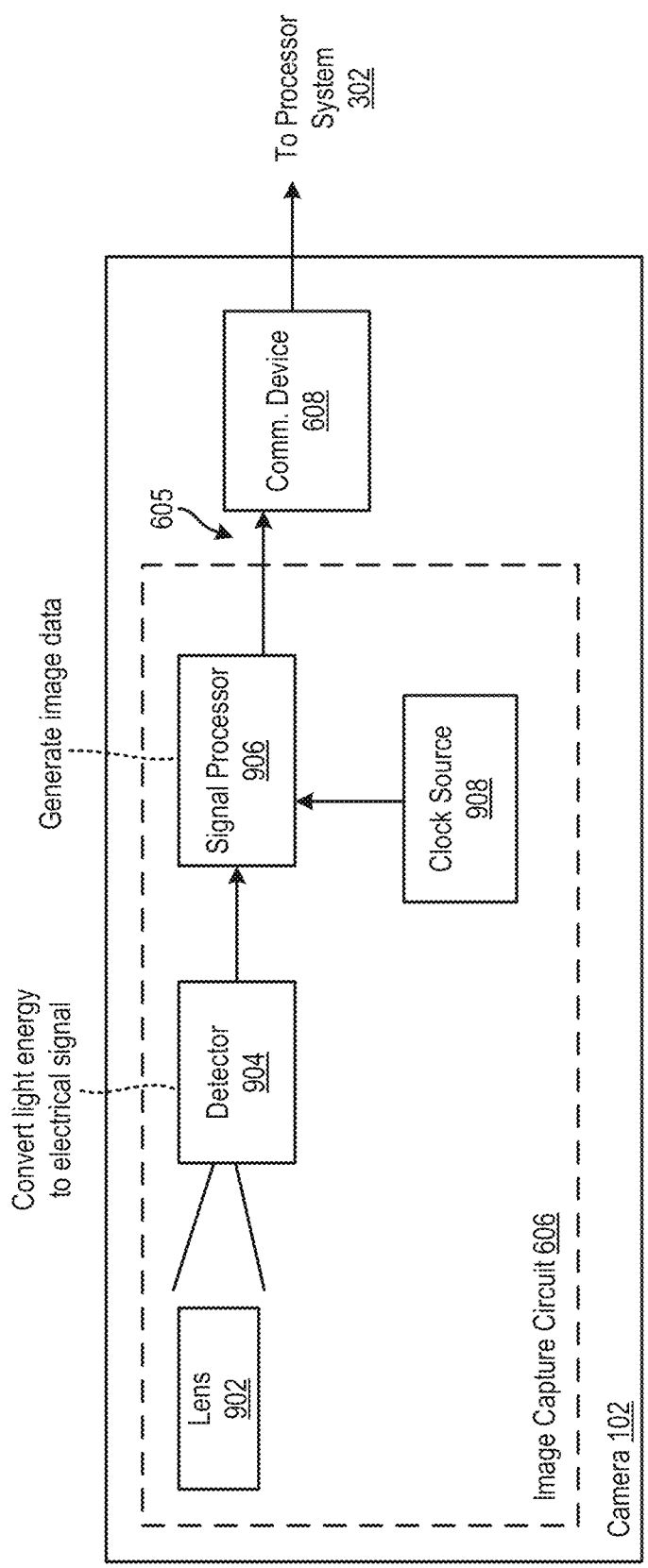
FIG. 9 is a diagram of an embodiment of the camera to illustrate generation and transfer of the image data from the camera to the processor system.

FIG. 9 is a diagram of an embodiment of the camera 102 to illustrate generation and transfer of the image data 605 from the camera 102 to the processor system 302. The camera 102 includes a lens 902, a detector 904, a signal processor 906, a clock source 908, and the communication device 608. An example of the detector 904 includes one or more photodiodes that detect light and convert the light into electrical signals. An example of the signal processor 906 includes a combination of an analog-to-digital converter and a processing component, such as an ASIC, a PLD, or a microprocessor, or a digital signal processor. The analog-to-digital converter of the signal processor 906 is coupled to the processing component of the signal processor 906. An example of the clock source 908 is a digital signal generator or an electronic oscillator.

The detector 904 is interfaced with the lens 902 and coupled to the signal processor 906, which is coupled to the clock source 908. Also, the signal processor 906 is coupled to the communication device 608. The lens 902 focuses light that is reflected by one or more of the real-world objects in front of the camera 102, and the light is focused on the detector 904. The detector 904 converts light energy of the light into electrical energy of the electrical signals, and provides electrical signals to the signal processor 906. The analog-to-digital converter of the signal processor 906 converts the electrical signals from an analog form to a digital form to output digital signals. The processing component of the signal processor 906 receives the digital signals from the analog-to-digital converter of the signal processor 906 and generates the image data 605 from the digital signals.

Also, the processing component of the signal processor 906 measures the time period, which includes times, at which the image data 605 is generated. For example, based on a clock signal received from the clock source 908, the processing component determines a time at which the action A1 is captured within the image data 605, a time at which the action A2 is captured within the image data 605, and a time at which the action A3 is captured within the image data 605. The processing component provides the image data 605 and the time period during which the image data 605 is generated to the communication device 608 for sending one or more packets including the time period and the image data 605 to the processor system 302.

Figure 10:
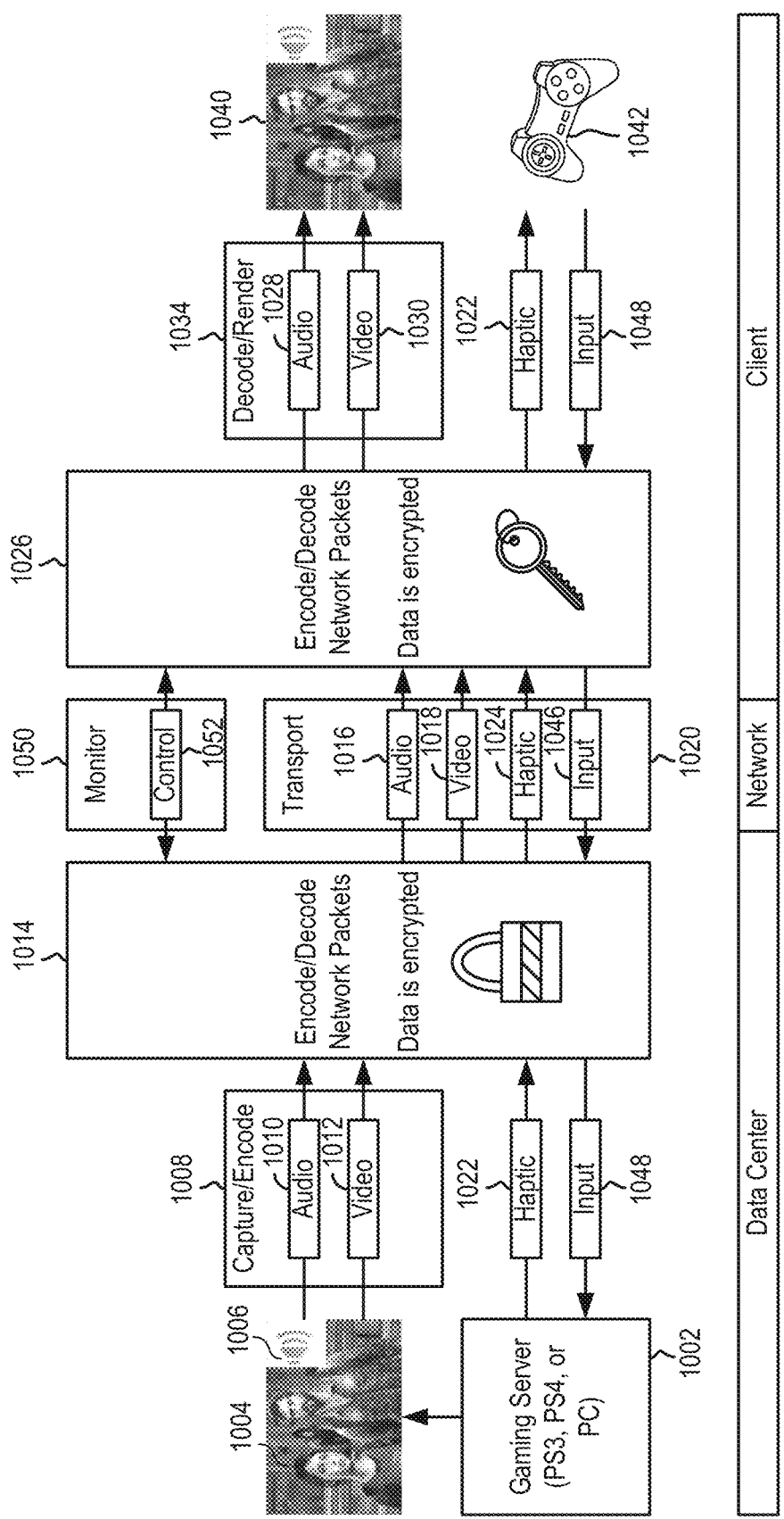
FIG. 10 is a flow diagram illustrating various operations, which are performed for streaming a cloud video game to a client device.

FIG. 10 is a flow diagram conceptually illustrating various operations which are performed for streaming a cloud video game to a client device, in accordance with implementations of the disclosure. Examples of the client device include a game controller, a smart phone, a game console, and a computer. A game server 1002 executes a video game and generates raw (uncompressed) video 1004 and audio 1006. The image data 605 (FIG. 6A) is an example of the video 1004. The game server 1002 is an example of the processor system 302 (FIG. 3A). The video 1004 and audio 1006 are captured and encoded for streaming purposes, as indicated at reference 1008 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 1010 and encoded video 1012 are further packetized into network packets, as indicated at reference numeral 1014, for purposes of transmission over a computer network 1020, which is an example of the computer network 602 (FIG. 6A). In some embodiments, the network packet encoding process also employs a data encryption process, thereby providing enhanced data security. In the illustrated implementation, audio packets 1016 and video packets 1018 are generated for transport over the computer network 1020.

The game server 1002 additionally generates haptic feedback data 1022, which is also packetized into network packets for network transmission. The haptic feedback data 718 (FIG. 7B) is an example of the haptic feedback data 1022. In the illustrated implementation, haptic feedback packets 1024 are generated for transport over the computer network 1020.

The foregoing operations of generating the raw video and audio and the haptic feedback data are performed on the game server 1002 of a data center, and the operations of encoding the video and audio, and packetizing the encoded audio/video and haptic feedback data for transport are performed by the streaming engine of the data center. As indicated at reference 1020, the audio, video, and haptic feedback packets are transported over the computer network. As indicated at reference 1026, the audio packets 1016, video packets 1018, and haptic feedback packets 1024, are disintegrated, e.g., parsed, etc., by a client device to extract encoded audio 1028, encoded video 1030, and haptic feedback data 1022 at the client device from the network packets. If data has been encrypted, then the data is also decrypted. The encoded audio 1028 and encoded video 1030 are then decoded by the client device, as indicated at reference 1034, to generate client-side raw audio and video data for rendering on a display device 1040 of the client device. The haptic feedback data 1022 is processed by the processor of the client device to produce a haptic feedback effect at a controller device 1042 or other interface device, e.g., the HMD, etc., through which haptic effects can be rendered. One example of a haptic effect is a vibration or rumble of the controller device 1042.

It will be appreciated that a video game is responsive to user inputs, and thus, a similar procedural flow to that described above for transmission and processing of user input, but in the reverse direction from client device to server, is performed. As shown, a controller device 1042 or another input device, e.g., the body part of the user 1, etc., or a combination thereof generates input data 1048. Any of the control input data 310A-310C (FIG. 3A) is an example of the input data 1048. The controller device 1042 is an example of any of the game controllers 1-3 (FIG. 3A). This input data 1048 is packetized at the client device for transport over the computer network to the data center. Input data packets 1046 are unpacked and reassembled by the game server 1002 to define the input data 1048 on the data center side. The input data 1048 is fed to the game server 1002, which processes the input data 1048 to generate a game state of the game.

During transport via the computer network 1020 of the audio packets 1016, the video packets 1018, and haptic feedback packets 1024, in some embodiments, the transmission of data over the computer network 1020 is monitored to ensure a quality of service. For example, network conditions of the computer network 1020 are monitored as indicated by reference 1050, including both upstream and downstream network bandwidth, and the game streaming is adjusted in response to changes in available bandwidth. That is, the encoding and decoding of network packets is controlled based on present network conditions, as indicated by reference 1052.

Figure 11:
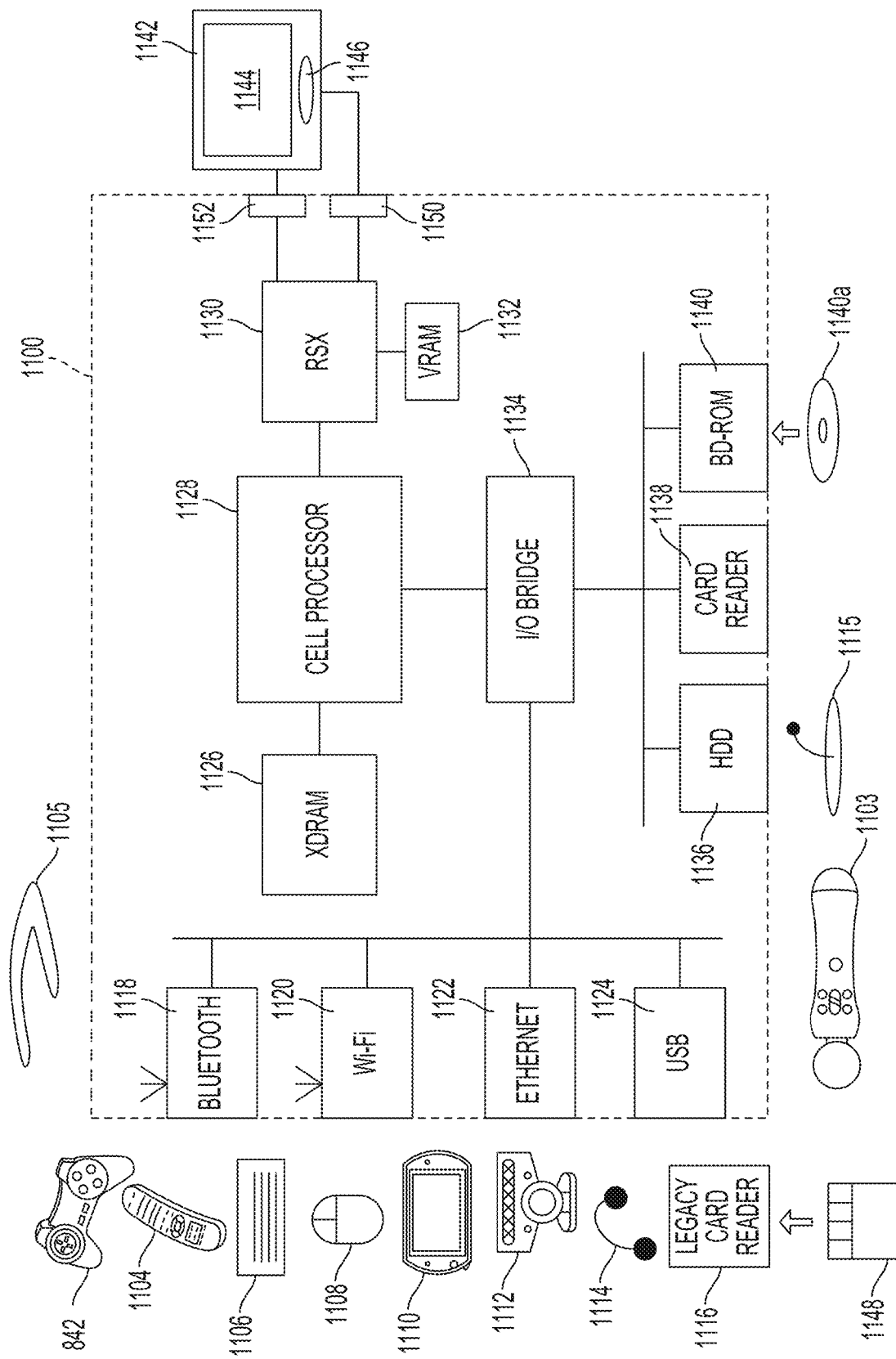
FIG. 11 is a block diagram of an embodiment of the game console that is compatible for interfacing with a display device of the client device or is capable of communicating via the computer network with a game hosting system.

FIG. 11 is a block diagram of an embodiment of a game console 1100 that is compatible for interfacing with a display device of the client device and is capable of communicating via the computer network 1020 with a game hosting system, such as the sever system 644 (FIG. 6B). The game console 642 (FIG. 6B) is an example of the game console 1100. The game console 1100 is located within a data center A or is located at a location at which the users 1-3 are located. In some embodiments, the game console 1100 is used to execute a game that is displayed on an HMD 1105. The game console 1100 is provided with various peripheral devices connectable to the game console 1100. The game console 1100 has a cell processor 1128, a dynamic random access memory (XDRAM) unit 1126, a Reality Synthesizer graphics processor unit 1130 with a dedicated video random access memory (VRAM) unit 1132, and an input/output (I/O) bridge 1134. The game console 1100 also has a Blu Ray® Disk read-only memory (BD-ROM) optical disk reader 1140 for reading from a disk 1140a and a removable slot-in hard disk drive (HDD) 1136, accessible through the I/O bridge 1134. Optionally, the game console 1100 also includes a memory card reader 1138 for reading compact flash memory cards, memory Stick® memory cards and the like, which is similarly accessible through the I/O bridge 1134. The I/O bridge 1134 also connects to Universal Serial Bus (USB) 2.0 ports 1124, a gigabit Ethernet port 1122, an IEEE 802.11b/g wireless network (Wi-Fi) port 1120, and a Bluetooth® wireless link port 1118 capable of supporting Bluetooth connections.

In operation, the I/O bridge 1134 handles all wireless, USB and Ethernet data, including data from game controllers 842 and/or 1103 and from the HMD 1105. For example, when any of the users 1-3 is playing the game generated by execution of a portion of a game code, the I/O bridge 1134 receives input data from the game controllers 842 and/or 1103 and/or from the HMD 1105 via a Bluetooth link and directs the input data to the cell processor 1128, which updates a current state of the game accordingly. As an example, a camera within the HMD 1105 captures a gesture of any of the users 1-3 to generate an image representing the gesture. The image is an example of the input data. Each game controller 842 and 1103 is an example of the game controller 1, the game controller 2, or the game controller 3. Each of the game controllers 1-3 is an example of a hand-held controller (HHC).

The wireless, USB and Ethernet ports also provide connectivity for other peripheral devices in addition to the game controllers 842 and 1103 and the HMD 1105, such as, for example, a remote control 1104, a keyboard 1106, a mouse 1108, a portable entertainment device 1110, such as, e.g., a Sony Playstation Portable® entertainment device, etc., a video camera, such as, e.g., an EyeToy® video camera 1112, etc., a microphone headset 1114, and a microphone 1115. The portable entertainment device 1110 is an example of any of the game controllers 1-3. In some embodiments, such peripheral devices are connected to the game console 1100 wirelessly, for example, the portable entertainment device 1110 communicates via a Wi-Fi ad-hoc connection, whilst the microphone headset 1114 communicates via a Bluetooth link.

The provision of these interfaces means that the game console 1100 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 1116 is connected to the game console 1100 via the USB port 1124, enabling the reading of memory cards 1148 of a kind used by the game console 1100. The game controllers 842 and 1103 and the HMD 1105 are operable to communicate wirelessly with the game console 1100 via the Bluetooth link 1118, or to be connected to the USB port 1124, thereby also receiving power by which to charge batteries of the game controller 842 and 1103 and the HMD 1105. In some embodiments, each of the game controllers 842 and 1103 and the HMD 1105 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 1100, and wireless devices using protocols, such as, e.g., Bluetooth, Wi-Fi, etc.

The game controller 842 is a controller designed to be used with two hands of any of the users 1-3, and game controller 1103 is a single-hand controller with an attachment. The HMD 1105 is designed to fit on top of a head and/or in front of eyes of the any of the users 1-3. In addition to one or more analog joysticks and conventional control buttons, each game controller 842 and 1103 is susceptible to three-dimensional location determination. Similarly, the HMD 1105 is susceptible to three-dimensional location determination. Consequently, in some embodiments, gestures and movements by any of the users 1-3 of the game controller 842 and 1103 and of the HMD 1105 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 1104 is also operable to communicate wirelessly with the game console 1100 via the Bluetooth link 1118. The remote control 1104 includes controls suitable for the operation of the Blu Ray™ Disk BD-ROM reader 1140 and for navigation of disk content.

The Blu Ray™ Disk BD-ROM reader 1140 is operable to read CD-ROMs compatible with the game console 1100, in addition to conventional pre-recorded and recordable CDs, and so-called Super Audio CDs. The Blu Ray™ Disk BD-ROM reader 1140 is also operable to read digital video disk-ROMs (DVD-ROMs) compatible with the game console 1100, in addition to conventional pre-recorded and recordable DVDs. The Blu Ray™ Disk BD-ROM reader 1140 is further operable to read BD-ROMs compatible with the game console 1100, as well as conventional pre-recorded and recordable Blu-Ray Disks.

The game console 1100 is operable to supply audio and video, either generated or decoded via the Reality Synthesizer graphics unit 1130, through audio connectors 1150 and video connectors 1152 to a display and sound output device 1142, such as, e.g., a monitor or television set, etc., having a display screen 1144 and one or more loudspeakers 1146, or to supply the audio and video via the Bluetooth® wireless link port 1118 to the display device of the HMD 1105. The audio connectors 1150, in various embodiments, include conventional analogue and digital outputs whilst the video connectors 1152 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 1108. An operating system of the game console 1100 supports Dolby® 5.1 surround sound, Dolby® Theatre Surround (DTS), and the decoding of 7.1 surround sound from Blu-Ray® disks.

In some embodiments, a video camera, e.g., the video camera 1112, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 1100. An LED indicator of the video camera 1112 is arranged to illuminate in response to appropriate control data from the game console 1100, for example, to signify adverse lighting conditions, etc. Some embodiments of the video camera 1112 variously connect to the game console 1100 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 1100, an appropriate piece of software, such as, a device driver, etc., is provided.

In some embodiments, the aforementioned system devices, including the game console 1100, the HHC, and the HMD 1105 enable the HMD 1105 to display and capture video of an interactive session of a game. The system devices initiate an interactive session of a game, the interactive session defining interactivity between any of the users 1-3 and the game. The system devices further determine an initial position and orientation of the HHC and/or the HMD 1105 operated by any of the users 1-3. The game console 1100 determines a current state of a game based on the interactivity between any of the users 1-3 and the game. The system devices track a position and orientation of the HHC and/or the HMD 1105 during an interactive session of any of the users 1-3 with a game. The system devices generate a spectator video stream of the interactive session based on a current state of a game and the tracked position and orientation of the HHC and/or the HMD 1105. In some embodiments, the HHC renders the spectator video stream on a display screen of the HHC. In various embodiments, the HMD 1105 renders the spectator video stream on a display screen of the HMD 1105.

Figure 12:
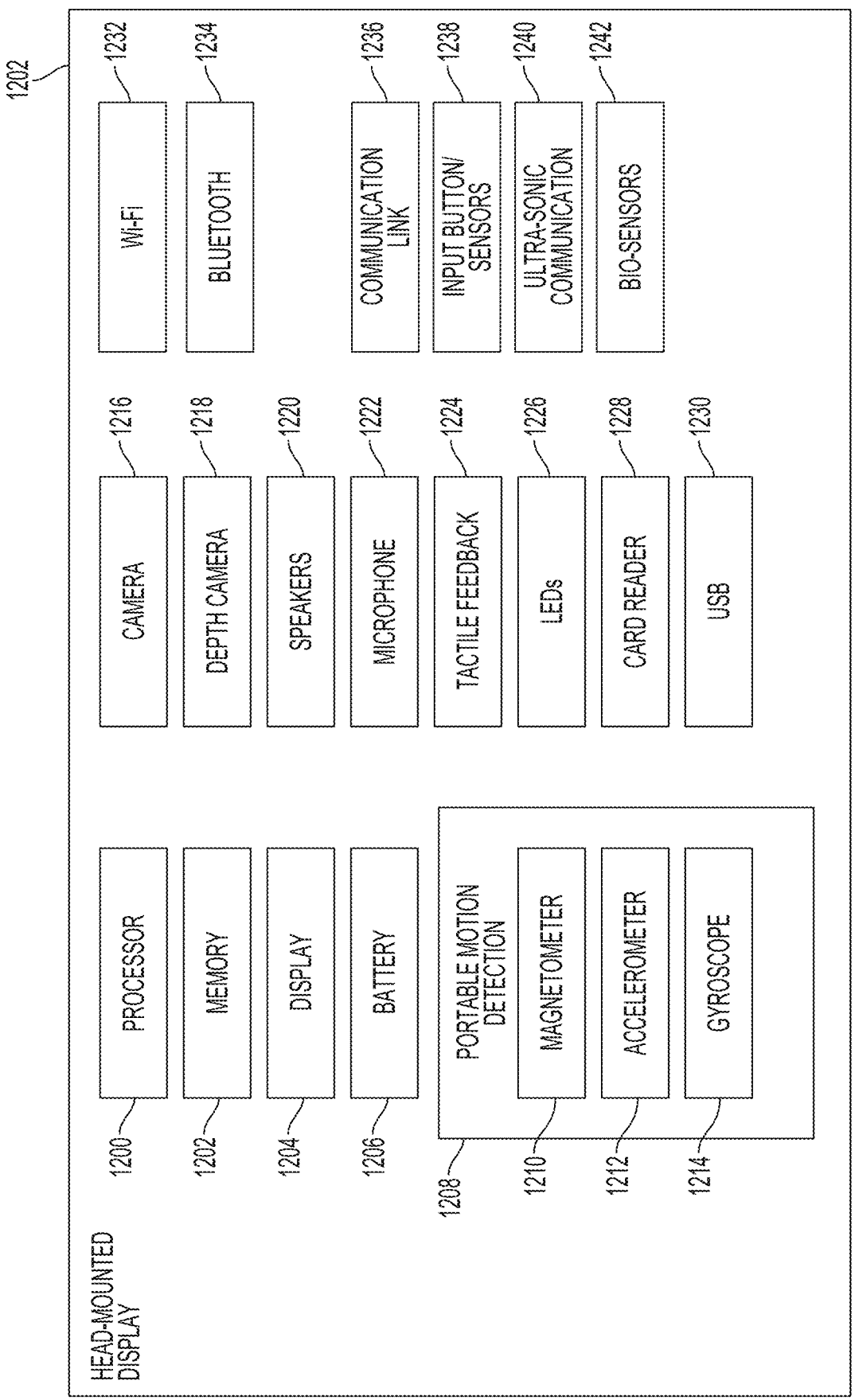
FIG. 12 is a diagram of an embodiment of a head-mounted display (HMD).

With reference to FIG. 12, a diagram illustrating components of an HMD 1202 is shown. The HMD 1202 is an example of the HMD 1105 (FIG. 11). The HMD 1202 includes a processor 1200 for executing program instructions. A memory device 1202 is provided for storage purposes. Examples of the memory device 1202 include a volatile memory, a non-volatile memory, or a combination thereof. A display device 1204 is included which provides a visual interface, e.g., display of image frames generated from save data, etc., that any of the users 1-3 (FIG. 1) views. A battery 1206 is provided as a power source for the HMD 1202. A motion detection module 1208 includes any of various kinds of motion sensitive hardware, such as a magnetometer 1210, an accelerometer 1212, and a gyroscope 1214.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1212 are used to provide the direction of gravity, which gives an absolute reference for two angles, e.g., world-space pitch and world-space roll, etc.

A magnetometer measures a strength and a direction of a magnetic field in a vicinity of the HMD 1202. In some embodiments, three magnetometers 1210 are used within the HMD 1202, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1214, a camera 1216, etc. In one embodiment, the accelerometer 1212 is used together with magnetometer 1210 to obtain the inclination and azimuth of the HMD 1202.

A gyroscope is a device for measuring or maintaining orientation, based on the principles of angular momentum. In one embodiment, instead of the gyroscope 1214, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1216 is provided for capturing images and image streams of a real-world environment, e.g., room, cabin, natural environment, etc., surrounding any of the users 1-3. In various embodiments, more than one camera is included in the HMD 1202, including a camera that is rear-facing, e.g., directed away from any of the users 1-3 when the user is viewing the display of the HMD 1202, etc., and a camera that is front-facing, e.g., directed towards any of the users 1-3 when the user is viewing the display of the HMD 1202, etc. Additionally, in several embodiments, a depth camera 1218 is included in the HMD 1202 for sensing depth information of objects in the real-world environment.

The HMD 1202 includes speakers 1220 for providing audio output. Also, a microphone 1222 is included, in some embodiments, for capturing audio from the real-world environment, including sounds from an ambient environment, and speech made by the any of the users 1-3, etc. The HMD 1202 includes a tactile feedback module 1224, e.g., a vibration device, etc., for providing tactile feedback to any of the users 1-3. In one embodiment, the tactile feedback module 1224 is capable of causing movement and/or vibration of the HMD 1202 to provide tactile feedback to any of the users 1-3.

LEDs 1226 are provided as visual indicators of statuses of the HMD 1202. For example, an LED may indicate battery level, power on, etc. A card reader 1228 is provided to enable the HMD 1202 to read and write information to and from a memory card. A USB interface 1230 is included as one example of an interface for enabling connection of peripheral devices, or connection to other devices, such as other portable devices, computers, etc. In various embodiments of the HMD 1202, any of various kinds of interfaces may be included to enable greater connectivity of the HMD 1202.

A Wi-Fi module 1232 is included for enabling connection to the Internet via wireless networking technologies. Also, the HMD 1202 includes a Bluetooth module 1234 for enabling wireless connection to other devices. A communications link 1236 is also included, in some embodiments, for connection to other devices. In one embodiment, the communications link 1236 utilizes infrared transmission for wireless communication. In other embodiments, the communications link 1236 utilizes any of various wireless or wired transmission protocols for communication with other devices.

Input buttons/sensors 1238 are included to provide an input interface for any of the users 1-3 (FIG. 1). Any of various kinds of input interfaces are included, such as buttons, touchpad, joystick, trackball, etc. An ultra-sonic communication module 1240 is included, in various embodiments, in the HMD 1202 for facilitating communication with other devices via ultra-sonic technologies.

Bio-sensors 1242 are included to enable detection of physiological data from a user. In one embodiment, the bio-sensors 1242 include one or more dry electrodes for detecting bio-electric signals of the user through the user's skin.

The foregoing components of HMD 1202 have been described as merely exemplary components that may be included in HMD 1202. In various embodiments, the HMD 1202 include or do not include some of the various aforementioned components.

Figure 13:
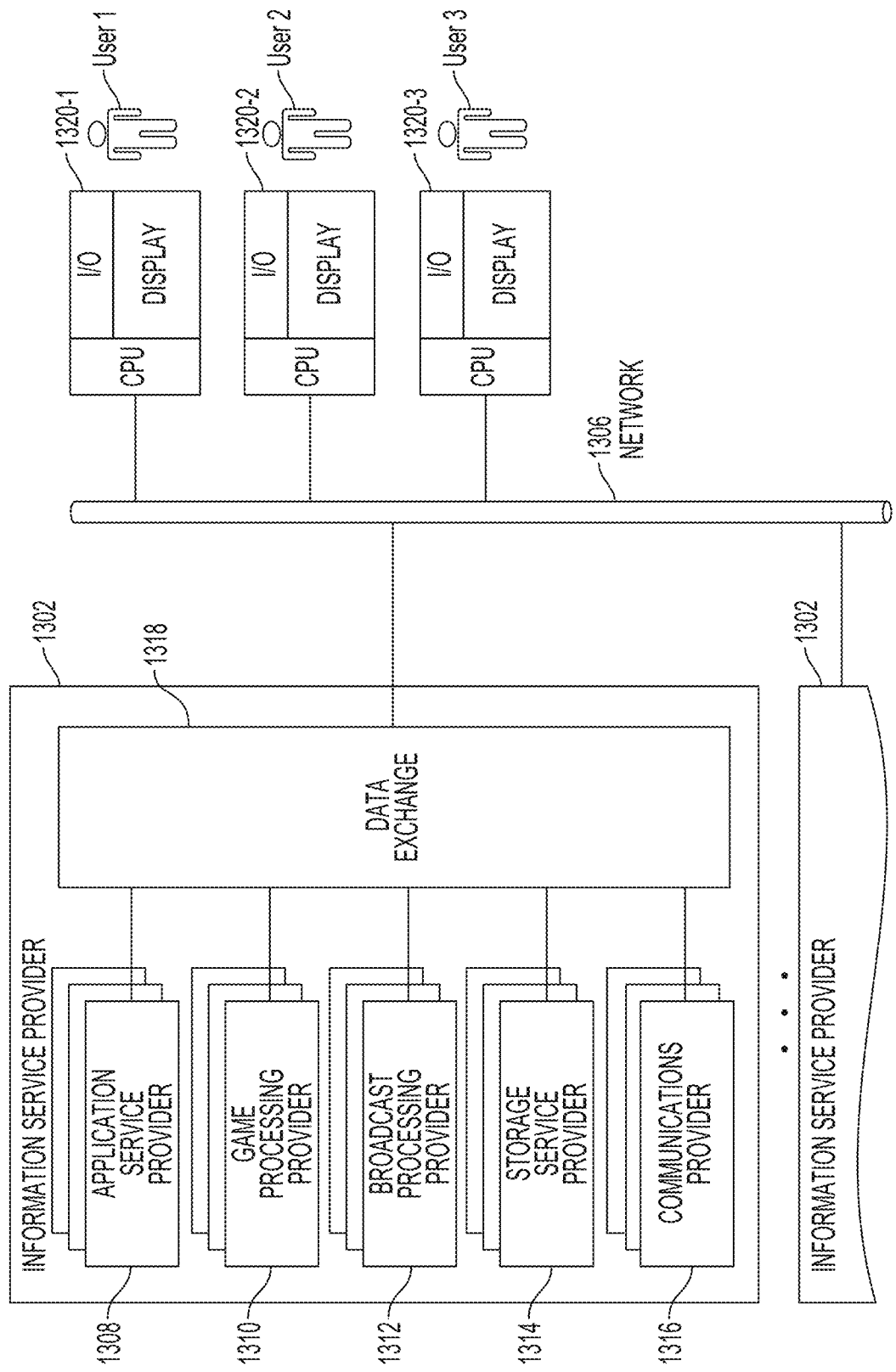
FIG. 13 illustrates an embodiment of an Information Service Provider (INSP) architecture.

FIG. 13 illustrates an embodiment of an Information Service Provider (INSP) architecture. INSPs 1302 delivers a multitude of information services to the users 1-3 geographically dispersed and connected via a computer network 1306, e.g., a LAN, a WAN, or a combination thereof, etc. The computer network 602 (FIG. 6B) is an example of the computer network 1306. An example of the WAN includes the Internet and an example of the LAN includes an Intranet. The user 1 operates a client device 1320-1, the user 2 operates another client device 1320-2, and the user 3 operates yet another client device 1320-3.

In some embodiments, each client device 1320-1, 1320-2, and 1320-3 includes a central processing unit (CPU), a display, and an input/output (I/O) interface. Examples of each client device 1320-1, 1320-2, and 1320-3 include a personal computer (PC), a mobile phone, a netbook, a tablet, a gaming system, a personal digital assistant (PDA), the game console 1100 and a display device, the HMD 1202 (FIG. 11), the game console 1100 and the HMD 1202, a desktop computer, a laptop computer, a smart television, etc. In some embodiments, the INSP 1302 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 1320-1 is served by an INSP in near proximity to the client device 1320-1 while the client device 1320-1 is in a home town of the user 1, and client device 1320-1 is served by a different INSP when the user 1 travels to a different city. The home-town INSP will transfer requested information and data to the new INSP, such that the information "follows" the client device 1320-1 to the new city making the data closer to the client device 1320-1 and easier to access. In various embodiments, a master-server relationship is established between a master INSP, which manages the information for the client device 1320-1, and a server INSP that interfaces directly with the client device 1320-1 under control from the master INSP. In some embodiments, data is transferred from one ISP to another ISP as the client device 1320-1 moves around the world to make the INSP in better position to service client device 1320-1 be the one that delivers these services.

The INSP 1302 includes an Application Service Provider (ASP) 1308, which provides computer-based services to customers over the computer network 1306. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 1320-1, 1320-2, and 1320-3 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 1306. The users 1-3 do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 1306, e.g., using servers, storage and logic, etc., based on how the computer network 1306 is depicted in computer network diagrams and is an abstraction for the complex infrastructure it conceals.

Further, the INSP 1302 includes a game processing provider (GPP) 1310, also sometime referred to herein as a game processing server, which is used by the client devices 1320-1, 1320-2, and 1320-3 to play single and multiplayer video games. Most video games played over the computer network 1306 operate via a connection to a game server. Typically, games use a dedicated server application that collects data from the client devices 1320-1, 1320-2, and 1320-3 and distributes it to other clients that are operated by other users. This is more efficient and effective than a peer-to-peer arrangement, but a separate server is used to host the server application. In some embodiments, the GPP 1310 establishes communication between the client devices 1320-1, 1320-2, and 1320-3, which exchange information without further relying on the centralized GPP 1310.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 1312, sometimes referred to herein as a broadcast processing provider, distributes audio or video signals to an audience. Broadcasting to a very narrow range of audience is sometimes called narrowcasting. A final leg of broadcast distribution is how a signal gets to the client devices 1320-1, 1320-2, and 1320-3, and the signal, in some embodiments, is distributed over the air as with a radio station or a television station to an antenna and receiver, or through a cable television or cable radio or "wireless cable" via the station. The computer network 1306 also brings, in various embodiments, either radio or television signals to the client devices 1320-1, 1320-2, and 1320-3, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 1314 provides computer storage space and related management services. The SSP 1314 also offers periodic backup and archiving. By offering storage as a service, the client devices 1320-1, 1320-2, and 1320-3 use more storage compared to when storage is not used as a service. Another major advantage is that the SSP 1314 includes backup services and the client devices 1320-1, 1320-2, and 1320-3 will not lose data if their hard drives fail. Further, a plurality of SSPs, in some embodiments, have total or partial copies of the data received from the client devices 1320-1, 1320-2, and 1320-3, allowing the client devices 1320-1, 1320-2, and 1320-3 to access data in an efficient way independently of where the client devices 1320-1, 1320-2, and 1320-3 are located or of types of the clients. For example, the user 1 accesses personal files via a home computer, as well as via a mobile phone while the user 1 is on the move.

A communications provider 1316 provides connectivity to the client devices 1320-1, 1320-2, and 1320-3. One kind of the communications provider 1316 is an Internet service provider (ISP) which offers access to the computer network 1306. The ISP connects the client devices 1320-1, 1320-2, and 1320-3 using a data transmission technology appropriate for delivering Internet Protocol datagrams, such as dial-up, digital subscriber line (DSL), cable modem, fiber, wireless or dedicated high-speed interconnects. The communications provider 1316 also provides, in some embodiments, messaging services, such as e-mail, instant messaging, and short message service (SMS) texting. Another type of a communications Provider is a network service provider (NSP), which sells bandwidth or network access by providing direct backbone access to the computer network 1306. Examples of network service providers include telecommunications companies, data carriers, wireless communications providers, Internet service providers, cable television operators offering high-speed Internet access, etc.

A data exchange 1318 interconnects the several modules inside INSP 1302 and connects these modules to the client devices 1320-1, 1320-2, and 1320-3 via computer network 1306. The data exchange 1318 covers, in various embodiments, a small area where all the modules of INSP 1302 are in close proximity, or covers a large geographic area when the different modules are geographically dispersed. For example, the data exchange 1302 includes a fast Gigabit Ethernet within a cabinet of a data center, or an intercontinental virtual LAN.

In some embodiments, communication between the server system and the client devices 1320-1 through 1320-3 may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog-to-digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for facilitating secret communication between a first player and a second player via a client device during a play of a game, comprising:
    receiving image data of the first player to identify one or more gestures during a game session of the game, wherein the one or more gestures are made by the first player towards the second player;
    receiving input data indicating one or more selections on a game controller during the game session, wherein the one or more selections are made by the second player;
    generating an inference of communication between the first player and the second player, wherein the inference of communication includes a determination that the one or more selections on the game controller are made in response to the one or more gestures made by the first player;
    generating additional inferences of communication between the first player and the second player;
    training an artificial intelligence model using the inference of communication and the additional inferences of communication between the first and second players;
    receiving additional image data to identify one or more additional gestures made by the first player for the second player during the play of the game, wherein the one or more additional gestures are made in a real-world environment including the first player and the second player;
    applying the one or more additional gestures to the artificial intelligence model for generating a recommendation for the second player, wherein the recommendation includes an action to be taken by the second player during the play of the game; and
    providing the recommendation to the client device used by the second player to notify the second player of the action.

2. The method of claim 1, wherein the recommendation is generated without receiving additional input data in response to the one or more additional gestures.

3. The method of claim 1, wherein said training the model comprises:
    extracting one or more features associated with the one or more gestures from the image data and one or more features from the input data;
    classifying the one or more features extracted from the image data to determine one or more actions performed by the first player;
    classifying the one or more features extracted from the input data to determine one or more actions performed by the second player; and
    associating the one or more actions determined as being performed by the first player and the one or more actions determined as being performed by the second player with a game context of the game.

4. The method of claim 1, wherein said generating the additional inferences of communication between the first player and the second player comprises:
    training the artificial intelligence model based on additional time relationships and additional game contexts over a period of time, wherein the additional time relationships are associated with one or more additional selections made by the second player in response to one or more yet additional gestures made by the first player.

5. The method of claim 1, wherein the game controller is a hand-held controller, wherein said generating the recommendation to the second player comprises:
    generating audio data to be sent to an audio device that is worn by the second player; or
    generating haptic feedback data to be sent to the hand-held controller that is held by the second player; or
    generating a message for display on a display device operated by the second player.

6. The method of claim 1, wherein the image data represents an eye gaze of the first player and a head movement of the first player.

7. A system for facilitating secret communication between a first player and a second player via a client device during a play of a game, comprising:
    an image camera configured to capture image data of the first player to identify one or more gestures during a game session of the game, wherein the one or more gestures are made by the first player towards the second player;
    a server coupled to the image camera via a computer network, wherein the server is configured to:
        receive input data indicating one or more selections on a game controller during the game session, wherein the one or more selections are made by the second player;
        generate an inference of communication between the first player and the second player, wherein the inference of communication includes a determination that the one or more selections on the game controller are made in response to the one or more gestures made by the first player;
        generate additional inferences of communication between the first player and the second player;
        train an artificial intelligence model using the inference of communication and the additional inferences of communication between the first and second players;

receive additional image data to identify one or more additional gestures made by the first player for the second player during the play of the game, wherein the one or more additional gestures are made in a real-world environment including the first player and the second player;

apply the one or more additional gestures to the artificial intelligence model to generate a recommendation for the second player, wherein the recommendation includes an action to be taken by the second player during the play of the game; and provide the recommendation to the client device used by the second player to notify the second player of the action.

8. The system of claim 7, wherein the recommendation is generated without receiving additional input data in response to the one or more additional gestures.

9. The system of claim 7, wherein to train the model, the server is configured to:

extract one or more features associated with the one or more gestures from the image data and one or more features from the input data;

classify the one or more features extracted from the image data to determine one or more actions performed by the first player;

classify the one or more features extracted from the input data to determine one or more actions performed by the second player; and associate the one or more actions determined as being performed by the first player and the one or more actions determined as being performed by the second player with a game context of the game.

10. The system of claim 7, wherein to generate the additional inferences of communication between the first user and the second user, the server is configured to:

train the artificial intelligence model based on additional time relationships and additional game contexts, wherein the additional time relationships are associated with one or more additional selections made by the second player in response to additional one or more yet additional gestures made by the first player.

11. The system of claim 7, wherein the game controller is a hand-held controller, wherein to generate the recommendation to the second player, the server is configured to:

generate audio data to be sent to an audio device that is worn by the second player; or generate haptic feedback data to be sent to the hand-held controller that is held by the second player; or generate a message for display on a display device operated by the second player.

12. The system of claim 7, wherein the image data represents an eye gaze of the first user and a head movement of the first user.

13. The system of claim 7, wherein the recommendation is generated when the second user does not pay attention to the one or more additional gestures made by the first user.

14. A computer system for facilitating secret communication between a first player and a second player via a client device during a play of a game, comprising:

a processor configured to:

receive image data of the first player to identify one or more gestures during a game session of the game, wherein the one or more gestures are made by the first player towards the second player;

receive input data indicating one or more selections on a game controller during the game session, wherein the one or more selections are made by the second player;

generate an inference of communication between the first player and the second player, wherein the inference of communication includes a determination that the one or more selections on the game controller are made in response to the one or more gestures made by the first player;

generate additional inferences of communication between the first player and the second player;

train an artificial intelligence model using the inference of communication and the additional inferences of communication between the first and second players;

receive additional image data to identify one or more additional gestures made by the first player for the second player during the play of the game, wherein the one or more additional gestures are made in a real-world environment including the first player and the second player;

apply the one or more additional gestures to the artificial intelligence model to generate a recommendation for the second player, wherein the recommendation includes an action to be taken by the second player during the play of the game; and provide the recommendation to the client device used by the second player to notify the second player of the action; and a memory device coupled to the processor.

15. The computer system of claim 14, wherein the recommendation is generated without receiving additional input data in response to the one or more additional gestures.

16. The computer system of claim 14, wherein to train the model, the processor is configured to:

extract one or more features associated with the one or more gestures from the image data and one or more features from the input data;

classify the one or more features extracted from the image data to determine one or more actions performed by the first player;

classify the one or more features extracted from the input data to determine one or more actions performed by the second player; and associate the one or more actions determined as being performed by the first player and the one or more actions determined as being performed by the second player with a game context of the game.

* * * * *